US010996922B2

(12) United States Patent
Seo et al.

(10) Patent No.: US 10,996,922 B2
(45) Date of Patent: May 4, 2021

(54) ELECTRONIC APPARATUS FOR PROCESSING USER UTTERANCE

(71) Applicant: Samsung Electronics Co., Ltd., Suwon-si (KR)

(72) Inventors: Jang Seok Seo, Suwon-si (KR); Ho Jun Jaygarl, Hwaseong-si (KR); Ji Hyun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 70 days.

(21) Appl. No.: 15/965,147

(22) Filed: Apr. 27, 2018

(65) Prior Publication Data

US 2018/0314489 A1 Nov. 1, 2018

(30) Foreign Application Priority Data

Apr. 30, 2017 (KR) .................. 10-2017-0055833

(51) Int. Cl.
*G06F 3/16* (2006.01)
*G10L 15/22* (2006.01)
(Continued)

(52) U.S. Cl.
CPC ............ *G06F 3/167* (2013.01); *G06F 3/0481* (2013.01); *G06F 3/0488* (2013.01);
(Continued)

(58) Field of Classification Search
CPC .... G06F 17/2765; G06F 3/167; G06F 17/243; G06F 3/0488; G06F 3/0481; G10L 15/265; G10L 2015/223; G10L 15/22
See application file for complete search history.

(56) References Cited

U.S. PATENT DOCUMENTS 5,818,800 A * 10/1998 Barker .................. G11B 31/00
369/29.02
5,857,099 A * 1/1999 Mitchell ................. G10L 15/22
704/235
(Continued)

FOREIGN PATENT DOCUMENTS

KR 10-2007-0106488 A 11/2007

OTHER PUBLICATIONS

International Search Report dated Sep. 5, 2018, issued in International Patent Application No. PCT/KR2018/004931.
(Continued)

*Primary Examiner* — Maikhanh Nguyen
(74) *Attorney, Agent, or Firm* — Jefferson IP Law, LLP

(57) ABSTRACT

An electronic apparatus is provided. The electronic apparatus includes a housing, a touchscreen display positioned inside the housing and exposed through a first area of the housing, a microphone positioned inside the housing and exposed through a second area of the housing, at least one speaker positioned inside the housing and exposed through a third area of the housing, a wireless communication circuit positioned inside the housing, a processor positioned inside the housing and electrically connected to the touchscreen display, the microphone, the at least one speaker, and the wireless communication circuit, and a memory positioned in the housing and electrically connected with the processor.

12 Claims, 15 Drawing Sheets

(51) Int. Cl.
*G06F 3/0488* (2013.01)
*G06F 3/0481* (2013.01)
*G06F 40/174* (2020.01)
*G06F 40/279* (2020.01)
*G10L 15/26* (2006.01)

(52) U.S. Cl.
CPC .......... *G06F 40/174* (2020.01); *G06F 40/279* (2020.01); *G10L 15/22* (2013.01); *G10L 15/26* (2013.01); *G10L 2015/223* (2013.01)

(56) References Cited

U.S. PATENT DOCUMENTS

| | | | | |
|---|---|---|---|---|
| 5,995,936 | A * | 11/1999 | Brais | G02B 27/017 369/25.01 |
| 6,259,657 | B1 * | 7/2001 | Swinney | H04M 11/10 379/75 |
| 6,282,154 | B1 * | 8/2001 | Webb | G06F 3/16 379/75 |
| 6,834,264 | B2 * | 12/2004 | Lucas | G10L 15/26 704/235 |
| 7,020,841 | B2 * | 3/2006 | Dantzig | G06F 3/038 715/716 |
| 7,082,397 | B2 * | 7/2006 | Cohen | H04M 3/493 379/88.17 |
| 7,870,000 | B2 * | 1/2011 | Ativanichayaphong | G10L 15/22 704/240 |
| 8,280,045 | B2 * | 10/2012 | Lee | G06F 3/04886 345/156 |
| 8,447,607 | B2 * | 5/2013 | Weider | G10L 15/22 704/250 |
| 8,630,846 | B2 * | 1/2014 | Ehsani | G06F 17/2775 704/231 |
| 9,305,374 | B2 | 4/2016 | Kocienda et al. | |
| 9,344,878 | B2 * | 5/2016 | Kang | G10L 13/00 |
| 9,355,472 | B2 | 5/2016 | Kocienda et al. | |
| 9,436,678 | B2 * | 9/2016 | Mathias | G06F 17/279 |
| 9,479,911 | B2 * | 10/2016 | Kang | G06F 40/58 |
| 9,606,985 | B2 * | 3/2017 | Goussard | G06F 16/3329 |
| 9,640,183 | B2 * | 5/2017 | Jung | G10L 15/32 |
| 9,747,279 | B2 | 8/2017 | Boies et al. | |
| 9,865,280 | B2 | 1/2018 | Sumner et al. | |
| 10,127,011 | B2 | 11/2018 | Bang et al. | |
| 2002/0143533 | A1 | 10/2002 | Lucas et al. | |
| 2002/0164000 | A1 * | 11/2002 | Cohen | H04M 3/493 379/88.17 |
| 2002/0169604 | A1 * | 11/2002 | Damiba | G10L 15/183 704/231 |
| 2003/0071833 | A1 * | 4/2003 | Dantzig | G06F 3/038 715/700 |
| 2004/0010410 | A1 * | 1/2004 | Oh | G10L 15/22 704/246 |
| 2005/0102146 | A1 | 5/2005 | Lucas et al. | |
| 2005/0182628 | A1 * | 8/2005 | Choi | G10L 15/08 704/252 |
| 2006/0149558 | A1 * | 7/2006 | Kahn | G10L 15/063 704/278 |
| 2007/0033005 | A1 * | 2/2007 | Cristo | G06F 17/279 704/9 |
| 2007/0127716 | A1 * | 6/2007 | Lee | G06F 3/04886 380/43 |
| 2008/0243502 | A1 * | 10/2008 | Ativanichayaphong | G10L 15/193 704/240 |
| 2009/0055163 | A1 * | 2/2009 | Jindal | G06F 17/2881 704/9 |
| 2010/0100377 | A1 * | 4/2010 | Madhavapeddi | G10L 15/22 704/235 |
| 2011/0178804 | A1 * | 7/2011 | Inoue | G10L 15/26 704/275 |
| 2013/0124195 | A1 * | 5/2013 | Ehsani | G06F 17/2775 704/9 |
| 2013/0304457 | A1 * | 11/2013 | Kang | G10L 13/00 704/201 |
| 2014/0242955 | A1 * | 8/2014 | Kang | H04W 4/18 455/414.1 |
| 2014/0267362 | A1 | 9/2014 | Kocienda et al. | |
| 2014/0267363 | A1 | 9/2014 | Kocienda et al. | |
| 2015/0287413 | A1 * | 10/2015 | Jung | G10L 15/32 704/231 |
| 2015/0364132 | A1 * | 12/2015 | Goussard | G06F 16/3329 704/257 |
| 2016/0034253 | A1 | 2/2016 | Bang et al. | |
| 2016/0149838 | A1 * | 5/2016 | Jeong | G06F 7/08 715/753 |
| 2016/0260433 | A1 | 9/2016 | Sumner et al. | |
| 2016/0291858 | A1 | 10/2016 | Kocienda et al. | |
| 2016/0307567 | A1 | 10/2016 | Boies et al. | |
| 2017/0116982 | A1 | 4/2017 | Gelfenbeyn et al. | |

OTHER PUBLICATIONS

Extended European Search Report dated Mar. 30, 2020, issued in a counterpart European application No. 18795275.9-1203 / 3610479.

* cited by examiner

ELECTRONIC APPARATUS FOR PROCESSING USER UTTERANCE

CROSS-REFERENCE TO RELATED APPLICATION(S)

This application is based on and claims priority under 35 U.S.C. § 119(a) of a Korean patent application number 10-2017-0055833, filed on Apr. 30, 2017, in the Korean Intellectual Property Office, the disclosure of which is incorporated by reference herein in its entirety.

TECHNICAL FIELD

The disclosure relates to a technology for processing a user's utterance.

BACKGROUND

In addition to an input scheme of the related art using a keyboard or a mouse, the latest electronic apparatuses have supported various input schemes such as a voice input and the like. For example, the electronic apparatus such as a smartphone or a tablet personal computer (PC) may recognize the voice of a user input while a speech recognition service is executed and may execute an action corresponding to a voice input or may provide the result found depending on the voice input.

Nowadays, the speech recognition service is being developed based on a natural language processing technology. The natural language processing determines the intent of the user utterance and provides the user with the result matched to the intent.

The above information is presented as background information only to assist with an understanding of the disclosure. No determination has been made, and no assertion is made, as to whether any of the above might be applicable as prior art with regard to the disclosure.

SUMMARY

Since the speech recognition service of the related art displays only the result according to a user's input when recognizing and processing the user's voice, the speech recognition service of the related art may process only the user's voice of executing the program, or the like, and a user input to request the execution of a plurality of applications may not be processed.

Since the speech recognition service of the related art incorrectly determines the user's intent included in the user utterance and the parameter for performing the intent, the speech recognition service of the related art may enter the wrong parameter into an input field of an application. Furthermore, a parameter, the format of which is different from the format of a parameter to be entered into the input field, may be entered into the input field.

Aspects of the disclosure are to address at least the above-mentioned problems and/or disadvantages and to provide at least the advantages described below. Accordingly, an aspect of the disclosure is to provide a method of extracting a parameter entered into an input field and processing the parameter to be matched to attribute information of the input field.

In accordance with an aspect of the disclosure, an electronic apparatus is provided. The electronic apparatus includes a housing, a touchscreen display positioned inside the housing and exposed through a first area of the housing, a microphone positioned inside the housing and exposed through a second area of the housing, at least one speaker positioned inside the housing and exposed through a third area of the housing, a wireless communication circuit positioned inside the housing, a processor positioned inside the housing and electrically connected to the touchscreen display, the microphone, the at least one speaker, and the wireless communication circuit, and a memory positioned in the housing and electrically connected with the processor. The memory stores instructions, when executed, cause the processor to display a user interface (UI) of an application in the touchscreen display, receive a user input including a first utterance and a second utterance through the microphone, transmit data associated with the user input to an external server through the wireless communication circuit, receive a response including a first text corresponding to the second utterance from the external server through the wireless communication circuit, and when the first utterance satisfies a predetermined condition, enter the first text or a second text generated based on the first text into an input field based on the first text and an attribute of the input field of the UI.

In accordance with another aspect of the disclosure, an electronic apparatus is provided. The electronic apparatus includes a housing, a touchscreen display positioned inside the housing and exposed through a first area of the housing, a microphone positioned inside the housing and exposed through a second area of the housing, at least one speaker positioned inside the housing and exposed through a third area of the housing, a wireless communication circuit positioned inside the housing, a processor positioned inside the housing and electrically connected to the touchscreen display, the microphone, the at least one speaker, and the wireless communication circuit, and a memory positioned in the housing and electrically connected with the processor. The memory stores instructions, when executed, cause the processor to display a UI of an application including an input field in the touchscreen display, receive a user input including a first utterance and a second utterance through the microphone, transmit data associated with the user input and information about an attribute of the input field to an external server through the wireless communication circuit, receive a response including a first text generated based on the second utterance and the attribute of the input field from the external server through the wireless communication circuit, and when the first utterance satisfies a predetermined condition, enter the first text into the input field.

According to various embodiments of the disclosure, a user terminal may change a parameter included in a user input to a parameter matched to the attribute of an input field depending on the intent of a user utterance and may enter the parameter matched to the attribute of the input field, thereby preventing an error according to an incorrect input.

In addition, when the parameter of a user input is not matched to the attribute of the input field, the user terminal may recognize that an incorrect parameter is entered. At this time, when the user terminal is able to change the incorrect parameter to a correct parameter, an error according to an incorrect input may be prevented.

In addition, a variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modification of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Before describing an embodiment of the disclosure, an integrated intelligent system to which an embodiment of the disclosure is applied will be described.

Figure 1:
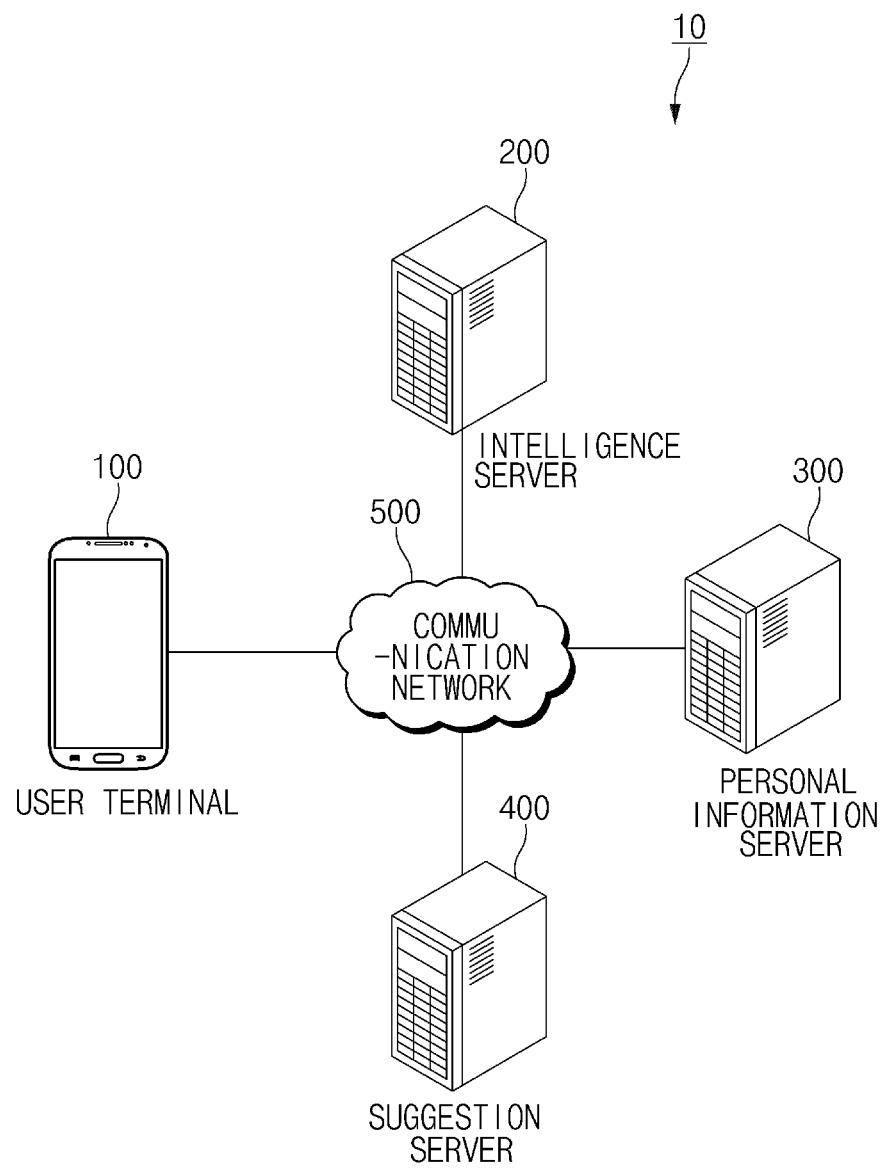
FIG. 1 is a view illustrating an integrated intelligent system according to various embodiments of the disclosure.

FIG. 1 is a view illustrating an integrated intelligent system according to various embodiments of the disclosure.

Referring to FIG. 1, an integrated intelligent system 10 may include a user terminal 100 (e.g., an electronic device 1501 of FIG. 15), an intelligence server 200 (e.g., a server 1508 of FIG. 15), a personal information server 300, or a suggestion server 400.

The user terminal 100 may provide a service necessary for a user through an app (or an application program) (e.g., an alarm app, a message app, a picture (gallery) app, or the like) stored in the user terminal 100. For example, the user terminal 100 may execute and operate other app through an intelligence app (or a speech recognition app) stored in the user terminal 100. A user input for launching and operating the other app through the intelligence app of the user terminal 100 may be received. For example, the user input may be received through a physical button, a touch pad, a voice input, a remote input, or the like. According to an embodiment, various types of terminal devices (or an electronic apparatus), which are connected with Internet, such as a mobile phone, a smartphone, personal digital assistant (PDA), a notebook computer, and the like may correspond to the user terminal 100.

According to an embodiment, the user terminal 100 may receive user utterance as a user input. The user terminal 100 may receive the user utterance and may generate an instruction for operating an app based on the user utterance. As such, the user terminal 100 may operate the app by using the instruction.

The intelligence server 200 may receive a voice input of a user from the user terminal 100 over a communication network and may convert the voice input to text data. In another embodiment, the intelligence server 200 may generate (or select) a path rule based on the text data. The path rule may include information about an action (or an operation) for performing the function of an app or information about a parameter necessary to perform the action. In addition, the path rule may include the order of the action of the app. The user terminal 100 may receive the path rule, may select an app depending on the path rule, and may execute an action included in the path rule in the selected app.

For example, the user terminal 100 may execute the action and may display a screen corresponding to a state of the user terminal 100, which executes the action, in a display. For another example, the user terminal 100 may execute the action and may not display the result obtained by executing the action in the display. For example, the user terminal 100 may execute a plurality of actions and may display only the result of a part of the plurality of actions in the display. For example, the user terminal 100 may display only the result, which is obtained by executing the last action, in the display. For another example, the user terminal 100 may receive the user input to display the result obtained by executing the action in the display.

The personal information server 300 may include a database in which user information is stored. For example, the personal information server 300 may receive the user information (e.g., context information, information about execution of an app, or the like) from the user terminal 100 and may store the user information in the database. The intelligence server 200 may be used to receive the user information from the personal information server 300 over the communication network and to generate a path rule associated with the user input. According to an embodiment, the user terminal 100 may receive the user information from the personal information server 300 over the communication network, and may use the user information as information for managing the database.

The suggestion server 400 may include a database storing information about a function in a terminal, introduction of an application, or a function to be provided. For example, the suggestion server 400 may include a database associated with a function that a user utilizes by receiving the user information of the user terminal 100 from the personal information server 300. The user terminal 100 may receive information about the function to be provided from the suggestion server 400 over the communication network and may provide the information to the user.

Figure 2:
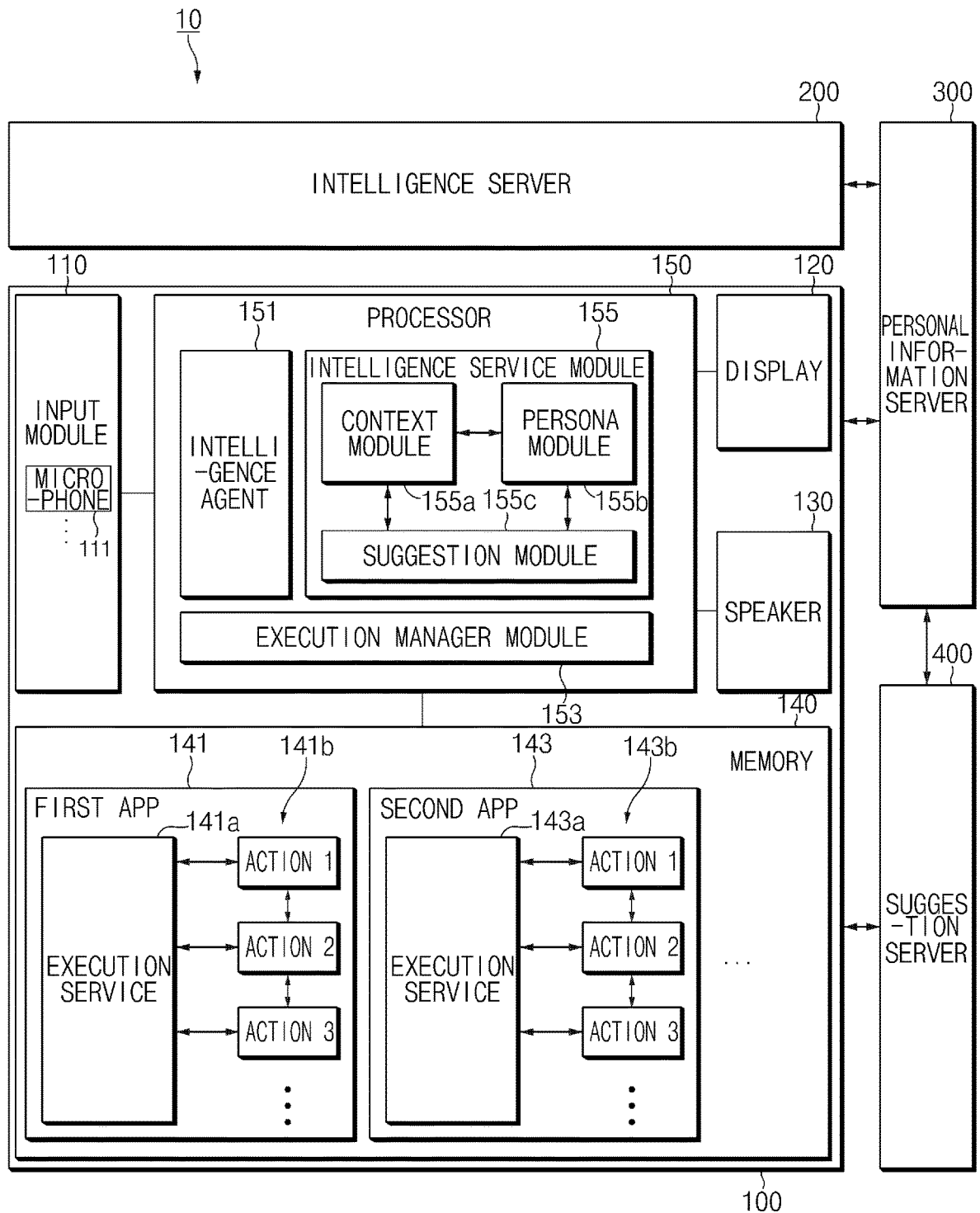
FIG. 2 is a block diagram illustrating a user terminal of an integrated intelligent system according to an embodiment of the disclosure.

FIG. 2 is a block diagram illustrating a user terminal of an integrated intelligent system according to an embodiment of the disclosure.

Referring to FIG. 2, the user terminal 100 may include an input module 110, a display 120, a speaker 130, a memory 140, or a processor 150. The user terminal 100 may further include a housing, and elements of the user terminal 100 may be seated in the housing or may be positioned on the housing.

According to an embodiment, the input module 110 may receive a user input from a user. For example, the input module 110 may receive the user input from the connected external device (e.g., a keyboard or a headset). For another example, the input module 110 may include a touch screen (e.g., a touch screen display) coupled to the display 120. For another example, the input module 110 may include a hardware key (or a physical key) placed in the user terminal 100 (or the housing of the user terminal 100).

According to an embodiment, the input module 110 may include a microphone (e.g., a microphone 111 of FIG. 3) that is capable of receiving user utterance as a voice signal. For example, the input module 110 may include a speech input system and may receive the utterance of the user as a voice signal through the speech input system.

According to an embodiment, the display 120 may display an image, a video, and/or an execution screen of an application. For example, the display 120 may display a graphical user interface (GUI) of an app.

According to an embodiment, the speaker 130 may output the voice signal. For example, the speaker 130 may output the voice signal generated in the user terminal 100 to the outside.

According to an embodiment, the memory 140 may store a plurality of apps 141 and 143. The plurality of apps 141 and 143 stored in the memory 140 may be selected, launched, and executed depending on the user input.

According to an embodiment, the memory 140 may include a database (DB) capable of storing information necessary to recognize the user input. For example, the memory 140 may include a log database capable of storing log information. For another example, the memory 140 may include a persona database capable of storing user information.

According to an embodiment, the memory 140 may store the plurality of apps 141 and 143, and the plurality of apps 141 and 143 may be loaded to operate. For example, the plurality of apps 141 and 143 stored in the memory 140 may be loaded by an execution manager module 153 of the processor 150 to operate. The plurality of apps 141 and 143 may include execution services 141a and 143a performing a function or a plurality of actions (or unit actions) 141b and 143b. The execution services 141a and 143a may be generated by the execution manager module 153 of the processor 150 and then may execute the plurality of actions 141b and 143b.

According to an embodiment, when the actions 141b and 143b of the apps 141 and 143 are executed, an execution state screen according to the execution of the actions 141b and 143b may be displayed in the display 120. For example, the execution state screen may be a screen in a state where the actions 141b and 143b are completed. For another example, the execution state screen may be a screen in a state where the execution of the actions 141b and 143b is in partial landing (e.g., in the case where a parameter necessary for the actions 141b and 143b are not input).

According to an embodiment, the execution services 141a and 143a may execute the actions 141b and 143b depending on a path rule. For example, the execution services 141a and 143a may be activated by the execution manager module 153, may receive an execution request from the execution manager module 153 depending on the path rule, and may execute the actions 141b and 143b of the apps 141 and 143 depending on the execution request. When the execution of the actions 141b and 143b is completed, the execution services 141a and 143a may transmit completion information to the execution manager module 153.

According to an embodiment, in the case where the plurality of the actions 141b and 143b are respectively executed in the apps 141 and 143, the plurality of the actions 141b and 143b may be sequentially executed. When the execution of one action (action 1) is completed, the execution services 141a and 143a may open the next action (action 2) and may transmit completion information to the execution manager module 153. Here, it is understood that opening an arbitrary action is to change a state of the arbitrary action to an executable state or to prepare the execution of the arbitrary action. In other words, when the arbitrary action is not opened, the corresponding action may be not executed. When the completion information is received, the execution manager module 153 may transmit an execution request for the next actions 141b and 143b to an execution service (e.g., action 2). According to an embodiment, in the case where the plurality of apps 141 and 143 are executed, the plurality of apps 141 and 143 may be sequentially executed. For example, when receiving the completion information after the execution of the last action of the first app 141 is executed, the execution manager module 153 may transmit the execution request of the first action of the second app 143 to the execution service 143a.

According to an embodiment, in the case where the plurality of the actions 141b and 143b are executed in the apps 141 and 143, a result screen according to the execution of each of the executed plurality of the actions 141b and 143b may be displayed in the display 120. According to an embodiment, only a part of a plurality of result screens according to the executed plurality of the actions 141b and 143b may be displayed in the display 120.

According to an embodiment, the memory 140 may store an intelligence app (e.g., a speech recognition app) operating in conjunction with an intelligence agent 151. The app operating in conjunction with the intelligence agent 151 may receive and process the utterance of the user as a voice signal. According to an embodiment, the app operating in conjunction with the intelligence agent 151 may be operated by a specific input (e.g., an input through a hardware key, an input through a touch screen, or a specific voice input) input through the input module 110.

According to an embodiment, the processor 150 may control overall actions of the user terminal 100. For example, the processor 150 may control the input module 110 to receive the user input. The processor 150 may control the display 120 to display an image. The processor 150 may control the speaker 130 to output the voice signal. The processor 150 may control the memory 140 to read or store necessary information.

According to an embodiment, the processor 150 may include the intelligence agent 151, the execution manager module 153, or an intelligence service module 155. In an embodiment, the processor 150 may drive the intelligence agent 151, the execution manager module 153, or the intelligence service module 155 by executing instructions stored in the memory 140. Modules described in various embodiments of the disclosure may be implemented by hardware or by software. In various embodiments of the disclosure, it is understood that the action executed by the intelligence agent 151, the execution manager module 153, or the intelligence service module 155 is an action executed by the processor 150.

According to an embodiment, the intelligence agent 151 may generate an instruction for operating an app based on the voice signal received as the user input. According to an embodiment, the execution manager module 153 may receive the generated instruction from the intelligence agent 151, and may select, launch, and operate the apps 141 and 143 stored in the memory 140. According to an embodiment, the intelligence service module 155 may manage information of the user and may use the information of the user to process the user input.

The intelligence agent 151 may transmit and process the user input received through the input module 110 to the intelligence server 200.

According to an embodiment, before transmitting the user input to the intelligence server 200, the intelligence agent 151 may pre-process the user input. According to an embodiment, to pre-process the user input, the intelligence agent 151 may include an adaptive echo canceller (AEC) module, a noise suppression (NS) module, an end-point detection (EPD) module, or an automatic gain control (AGC) module. The AEC may remove an echo included in the user input. The NS module may suppress a background noise included in the user input. The EPD module may detect an end-point of a user voice included in the user input to search for a part in which the user voice is present. The AGC module may adjust the volume of the user input so as to be suitable to recognize and process the user input. According to an embodiment, the intelligence agent 151 may include all the pre-processing elements for performance. However, in another embodiment, the intelligence agent 151 may include a part of the pre-processing elements to operate at low power.

According to an embodiment, the intelligence agent 151 may include a wake up recognition module recognizing a call of a user. The wake up recognition module may recognize a wake up instruction of the user through the speech recognition module. In the case where the wake up recognition module receives the wake up instruction, the wake up recognition module may activate the intelligence agent 151 to receive the user input. According to an embodiment, the wake up recognition module of the intelligence agent 151 may be implemented with a low-power processor (e.g., a processor included in an audio codec). According to an embodiment, the intelligence agent 151 may be activated depending on the user input entered through a hardware key. In the case where the intelligence agent 151 is activated, an intelligence app (e.g., a speech recognition app) operating in conjunction with the intelligence agent 151 may be executed.

According to an embodiment, the intelligence agent 151 may include a speech recognition module for performing the user input. The speech recognition module may recognize the user input for executing an action in an app. For example, the speech recognition module may recognize a limited user (voice) input (e.g., utterance such as "click" for executing a capturing action when a camera app is being executed) for executing an action such as the wake up instruction in the apps 141 and 143. For example, the speech recognition module for recognizing a user input while assisting the intelligence server 200 may recognize and rapidly process a user instruction capable of being processed in the user terminal 100. According to an embodiment, the speech recognition module for executing the user input of the intelligence agent 151 may be implemented in an app processor.

According to an embodiment, the speech recognition module (including the speech recognition module of a wake up module) of the intelligence agent 151 may recognize the user input by using an algorithm for recognizing a voice. For example, the algorithm for recognizing the voice may be at least one of a hidden Markov model (HMM) algorithm, an artificial neural network (ANN) algorithm, or a dynamic time warping (DTW) algorithm.

According to an embodiment, the intelligence agent 151 may change the voice input of the user to text data. According to an embodiment, the intelligence agent 151 may transmit the voice of the user to the intelligence server 200 to receive the changed text data. As such, the intelligence agent 151 may display the text data in the display 120.

According to an embodiment, the intelligence agent 151 may receive a path rule from the intelligence server 200. According to an embodiment, the intelligence agent 151 may transmit the path rule to the execution manager module 153.

According to an embodiment, the intelligence agent 151 may transmit the execution result log according to the path rule received from the intelligence server 200 to the intelligence service module 155, and the transmitted execution result log may be accumulated and managed in preference information of the user of a persona module 155b.

According to an embodiment, the execution manager module 153 may receive the path rule from the intelligence agent 151 to execute the apps 141 and 143 and may allow the apps 141 and 143 to execute the actions 141b and 143b included in the path rule. For example, the execution manager module 153 may transmit instruction information for executing the actions 141*b* and 143*b* to the apps 141 and 143 and may receive completion information of the actions 141*b* and 143*b* from the apps 141 and 143.

According to an embodiment, the execution manager module 153 may transmit or receive the instruction information for executing the actions 141*b* and 143*b* of the apps 141 and 143 between the intelligence agent 151 and the apps 141 and 143. The execution manager module 153 may bind the apps 141 and 143 to be executed depending on the path rule and may transmit the instruction information of the actions 141*b* and 143*b* included in the path rule to the apps 141 and 143. For example, the execution manager module 153 may sequentially transmit the actions 141*b* and 143*b* included in the path rule to the apps 141 and 143 and may sequentially execute the actions 141*b* and 143*b* of the apps 141 and 143 depending on the path rule.

According to an embodiment, the execution manager module 153 may manage execution states of the actions 141*b* and 143*b* of the apps 141 and 143. For example, the execution manager module 153 may receive information about the execution states of the actions 141*b* and 143*b* from the apps 141 and 143. For example, in the case where the execution states of the actions 141*b* and 143*b* are in partial landing (e.g., in the case where a parameter necessary for the actions 141*b* and 143*b* are not input), the execution manager module 153 may transmit information about the partial landing to the intelligence agent 151. The intelligence agent 151 may make a request for an input of necessary information (e.g., parameter information) to the user by using the received information. For another example, in the case where the execution state of the actions 141*b* and 143*b* are in an operating state, the utterance may be received from the user, and the execution manager module 153 may transmit information about the apps 141 and 143 being executed and the execution states of the apps 141 and 143 to the intelligence agent 151. The intelligence agent 151 may receive parameter information of the utterance of the user through the intelligence server 200 and may transmit the received parameter information to the execution manager module 153. The execution manager module 153 may change a parameter of each of the actions 141*b* and 143*b* to a new parameter by using the received parameter information.

According to an embodiment, the execution manager module 153 may transmit the parameter information included in the path rule to the apps 141 and 143. In the case where the plurality of apps 141 and 143 are sequentially executed depending on the path rule, the execution manager module 153 may transmit the parameter information included in the path rule from one app to another app.

According to an embodiment, the execution manager module 153 may receive a plurality of path rules. The execution manager module 153 may select a plurality of path rules based on the utterance of the user. For example, in the case where the user utterance specifies the app 141 executing a part of the action 141*b* but does not specify the app 143 executing any other action 143*b*, the execution manager module 153 may receive a plurality of different path rules in which the same app 141 (e.g., an gallery app) executing the part of the action 141*b* is executed and in which different apps 143 (e.g., a message app or a Telegram app) executing the other action 143*b*. For example, the execution manager module 153 may execute the same actions 141*b* and 143*b* (e.g., the same successive actions 141*b* and 143*b*) of the plurality of path rules. In the case where the execution manager module 153 executes the same action, the execution manager module 153 may display a state screen for selecting the different apps 141 and 143 included in the plurality of path rules in the display 120.

According to an embodiment, the intelligence service module 155 may include a context module 155*a*, a persona module 155*b*, or a suggestion module 155*c*.

The context module 155*a* may collect current states of the apps 141 and 143 from the apps 141 and 143. For example, the context module 155*a* may receive context information indicating the current states of the apps 141 and 143 to collect the current states of the apps 141 and 143.

The persona module 155*b* may manage personal information of the user utilizing the user terminal 100. For example, the persona module 155*b* may collect the usage information and the execution result of the user terminal 100 to manage personal information of the user.

The suggestion module 155*c* may predict the intent of the user to recommend an instruction to the user. For example, the suggestion module 155*c* may recommend an instruction to the user in consideration of the current state (e.g., a time, a place, context, or an app) of the user.

Figure 3:
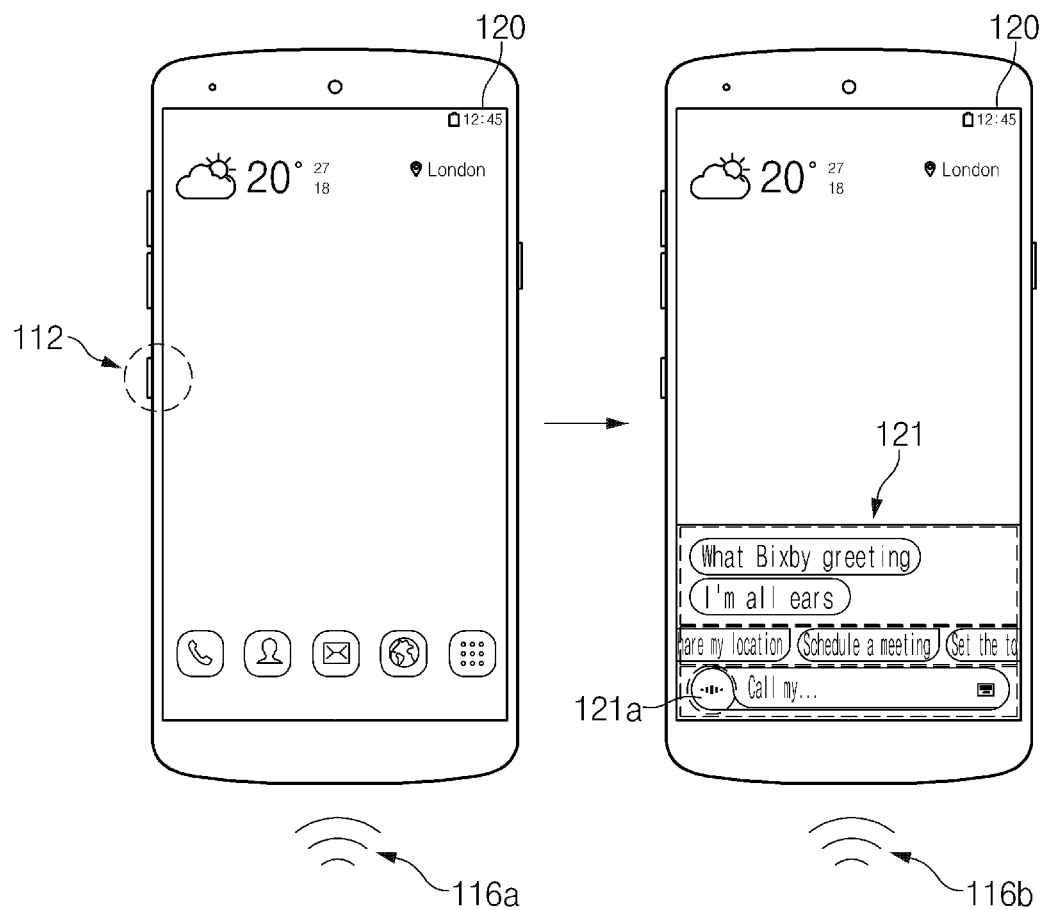
FIG. 3 is a view illustrating execution of an intelligence app of a user terminal according to an embodiment of the disclosure.

FIG. 3 is a view illustrating execution of an intelligence app of a user terminal according to an embodiment of the disclosure.

Referring to FIG. 3, the user terminal 100 receives a user input to execute an intelligence app (e.g., a speech recognition app) operating in conjunction with the intelligence agent 151.

According to an embodiment, the user terminal 100 may execute the intelligence app for recognizing a voice through a hardware key 112. For example, in the case where the user terminal 100 receives the user input through the hardware key 112, the user terminal 100 may display a user interface (UI) 121 of the intelligence app in the display 120. For example, a user may touch a speech recognition button 121*a* of the UI 121 of the intelligence app for the purpose of entering a voice 116*b* in a state where the UI 121 of the intelligence app is displayed in the display 120. For another example, while continuously pressing the hardware key 112 to enter the voice 116*b*, the user may enter the voice 116*b*.

According to an embodiment, the user terminal 100 may execute the intelligence app for recognizing a voice through the microphone 111. For example, in the case where a specified voice (e.g., wake up!) is entered 116*a* through the microphone 111, the user terminal 100 may display the UI 121 of the intelligence app in the display 120.

Figure 4:
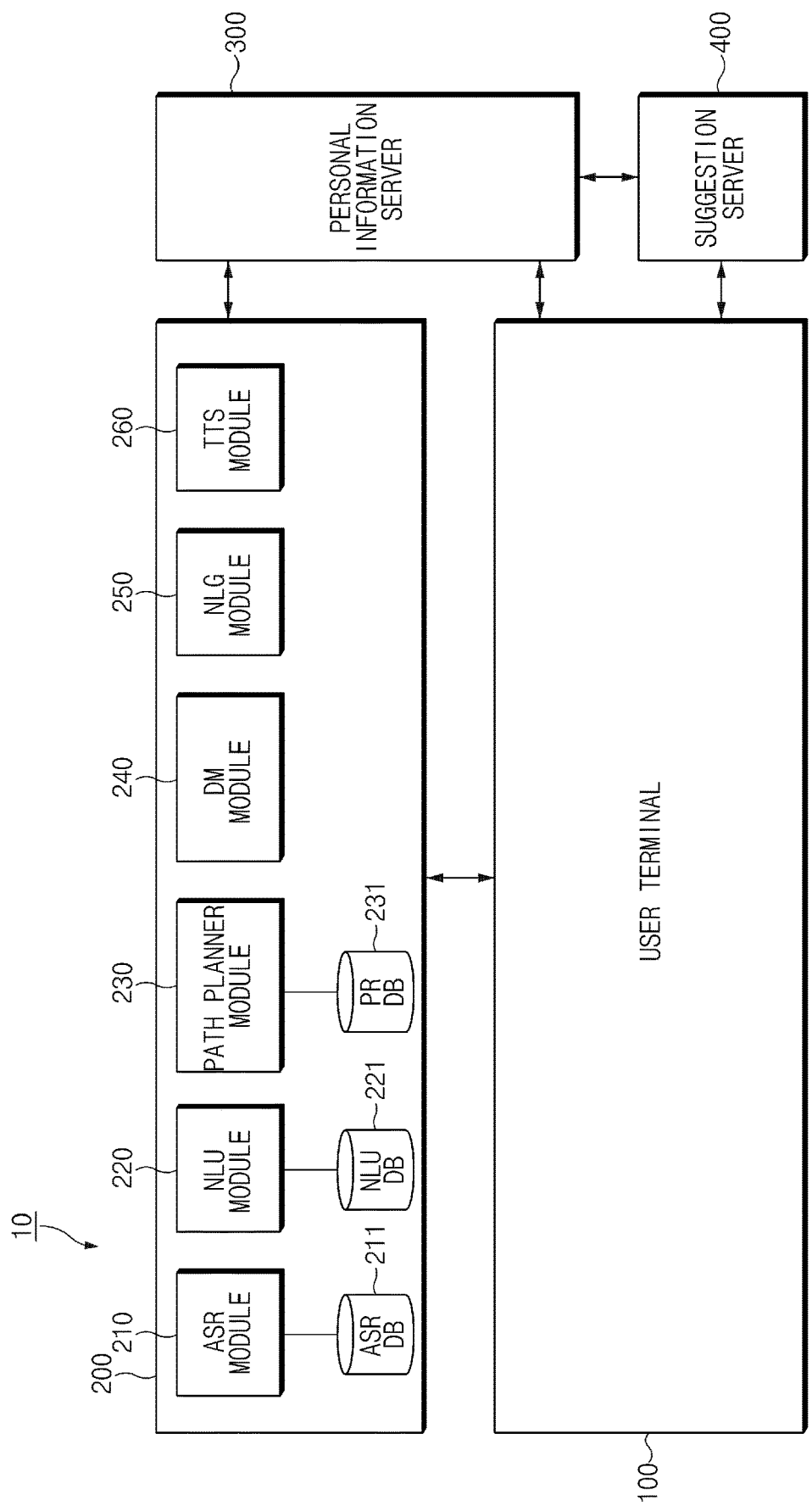
FIG. 4 is a block diagram illustrating an intelligence server of an integrated intelligent system according to an embodiment of the disclosure.

FIG. 4 is a block diagram illustrating an intelligence server of an integrated intelligent system according to an embodiment of the disclosure.

Referring to FIG. 4, the intelligence server 200 may include an automatic speech recognition (ASR) module 210, a natural language understanding (NLU) module 220, a path planner module 230, a dialogue manager (DM) module 240, a natural language generator (NLG) module 250, or a text to speech (TTS) module 260.

The NLU module 220 or the path planner module 230 of the intelligence server 200 may generate a path rule.

According to an embodiment, the ASR module 210 may change the user input received from the user terminal 100 to text data.

For example, the ASR module 210 may include an utterance recognition module. The utterance recognition module may include an acoustic model and a language model. For example, the acoustic model may include information associated with utterance, and the language model may include unit phoneme information and information about a combination of unit phoneme information. The utterance recognition module may change user utterance to text data by using the information associated with utterance and unit phoneme information. For example, the information about the acoustic model and the language model may be stored in an ASR DB 211.

According to an embodiment, the NLU module 220 may determine user intent by performing syntactic analysis or semantic analysis. The syntactic analysis may divide the user input into syntactic units (e.g., words, phrases, morphemes, and the like) and determine which syntactic elements the divided units have. The semantic analysis may be performed by using semantic matching, rule matching, formula matching, or the like. As such, the NLU module 220 may obtain a domain, intent, or a parameter (or a slot) necessary for the user input to express the intent.

According to an embodiment, the NLU module 220 may determine the intent of the user and parameter by using a matching rule that is divided into a domain, intent, and a parameter (or a slot) necessary to determine the intent. For example, the one domain (e.g., an alarm) may include a plurality of intent (e.g., alarm settings, alarm cancellation, and the like), and one intent may include a plurality of parameters (e.g., a time, the number of iterations, an alarm sound, and the like). For example, the plurality of rules may include one or more necessary parameters. The matching rule may be stored in a NLU database (NLU DB) 221.

According to an embodiment, the NLU module 220 may determine the meaning of words extracted from a user input by using linguistic features (e.g., grammatical elements) such as morphemes, phrases, and the like and may match the meaning of the determined words to the domain and intent to determine user intent. For example, the NLU module 220 may calculate how many words extracted from the user input is included in each of the domain and the intent, for the purpose of determining the user intent. According to an embodiment, the NLU module 220 may determine a parameter of the user input by using the words that are the basis for determining the intent. According to an embodiment, the NLU module 220 may determine the user intent by using the NLU DB 221, which stores the linguistic features for determining the intent of the user input. According to another embodiment, the NLU module 220 may determine the user intent by using a personal language model (PLM). For example, the NLU module 220 may determine the user intent by using the personalized information (e.g., a contact list or a music list). For example, the PLM may be stored in the NLU DB 221. According to an embodiment, the ASR module 210 as well as the NLU module 220 may recognize the voice of the user with reference to the PLM stored in the NLU DB 221.

According to an embodiment, the NLU module 220 may generate a path rule based on the intent of the user input and the parameter. For example, the NLU module 220 may select an app to be executed, based on the intent of the user input and may determine an action to be executed, in the selected app. The NLU module 220 may determine the parameter corresponding to the determined action to generate the path rule. According to an embodiment, the path rule generated by the NLU module 220 may include information about the app to be executed, the action to be executed in the app, and a parameter necessary to execute the action.

According to an embodiment, the NLU module 220 may generate one path rule, or a plurality of path rules based on the intent of the user input and the parameter. For example, the NLU module 220 may receive a path rule set corresponding to the user terminal 100 from the path planner module 230 and may map the intent of the user input and the parameter to the received path rule set for the purpose of determining the path rule.

According to another embodiment, the NLU module 220 may determine the app to be executed, the action to be executed in the app, and a parameter necessary to execute the action based on the intent of the user input and the parameter for the purpose of generating one path rule or a plurality of path rules. For example, the NLU module 220 may arrange the app to be executed and the action to be executed in the app by using information of the user terminal 100 depending on the intent of the user input in the form of ontology or a graph model for the purpose of generating the path rule. For example, the generated path rule may be stored in a path rule (PR) DB 231 through the path planner module 230. The generated path rule may be added to a path rule set of the PR DB 231.

According to an embodiment, the NLU module 220 may select at least one path rule of the generated plurality of path rules. For example, the NLU module 220 may select an optimal path rule of the plurality of path rules. For another example, in the case where only a part of action is specified based on the user utterance, the NLU module 220 may select a plurality of path rules. The NLU module 220 may determine one path rule of the plurality of path rules depending on an additional input of the user.

According to an embodiment, the NLU module 220 may transmit the path rule to the user terminal 100 in response to a request for the user input. For example, the NLU module 220 may transmit one path rule corresponding to the user input to the user terminal 100. For another example, the NLU module 220 may transmit the plurality of path rules corresponding to the user input to the user terminal 100. For example, in the case where only a part of action is specified based on the user utterance, the plurality of path rules may be generated by the NLU module 220.

According to an embodiment, the path planner module 230 may select at least one path rule of the plurality of path rules.

According to an embodiment, the path planner module 230 may transmit a path rule set including the plurality of path rules to the NLU module 220. The plurality of path rules of the path rule set may be stored in the PR DB 231 connected to the path planner module 230 in the table form. For example, the path planner module 230 may transmit a path rule set corresponding to information (e.g., operating system (OS) information or app information) of the user terminal 100, which is received from the intelligence agent 151, to the NLU module 220. For example, a table stored in the PR DB 231 may be stored for each domain or for each version of the domain.

According to an embodiment, the path planner module 230 may select one path rule or the plurality of path rules from the path rule set to transmit the selected one path rule or the selected plurality of path rules to the NLU module 220. For example, the path planner module 230 may match the user intent and the parameter to the path rule set corresponding to the user terminal 100 to select one path rule or a plurality of path rules and may transmit the selected one path rule or the selected plurality of path rules to the NLU module 220.

According to an embodiment, the path planner module 230 may generate the one path rule or the plurality of path rules by using the user intent and the parameter. For example, the path planner module 230 may determine the app to be executed and the action to be executed in the app based on the user intent and the parameter for the purpose of generating the one path rule or the plurality of path rules. According to an embodiment, the path planner module 230 may store the generated path rule in the PR DB 231.

According to an embodiment, the path planner module 230 may store the path rule generated by the NLU module 220 in the PR DB 231. The generated path rule may be added to the path rule set stored in the PR DB 231.

According to an embodiment, the table stored in the PR DB 231 may include a plurality of path rules or a plurality of path rule sets. The plurality of path rules or the plurality of path rule sets may reflect the kind, version, type, or characteristic of a device performing each path rule.

According to an embodiment, the DM module 240 may determine whether the user intent determined by the NLU module 220 is clear. For example, the DM module 240 may determine whether the user intent is clear, based on whether the information of a parameter is sufficient. The DM module 240 may determine whether the parameter determined by the NLU module 220 is sufficient to perform a task. According to an embodiment, in the case where the user intent is not clear, the DM module 240 may perform a feedback for making a request for necessary information to the user. For example, the DM module 240 may perform feedback for making a request for information about the parameter for determining the user intent.

According to an embodiment, the DM module 240 may include a content provider module. In the case where the content provider module executes an action based on the intent and the parameter determined by the NLU module 220, the content provider module may generate the result obtained by performing a task corresponding to the user input. According to an embodiment, the DM module 240 may transmit the result generated by the content provider module as the response to the user input to the user terminal 100.

According to an embodiment, the NLG module 250 may change specified information to a text form. Information changed to the text form may be a form of a natural language utterance. For example, the specified information may be information about an additional input, information for guiding the completion of an action corresponding to the user input, or information for guiding the additional input of the user (e.g., feedback information about the user input). The information changed to the text form may be displayed in the display 120 after being transmitted to the user terminal 100 or may be changed to a voice form after being transmitted to the TTS module 260.

According to an embodiment, the TTS module 260 may change information of the text form to information of a voice form. The TTS module 260 may receive the information of the text form from the NLG module 250, may change the information of the text form to the information of a voice form, and may transmit the information of the voice form to the user terminal 100. The user terminal 100 may output the information of the voice form to the speaker 130.

According to an embodiment, the NLU module 220, the path planner module 230, and the DM module 240 may be implemented with one module. For example, the NLU module 220, the path planner module 230 and the DM module 240 may be implemented with one module, may determine the user intent and the parameter, and may generate a response (e.g., a path rule) corresponding to the determined user intent and parameter. As such, the generated response may be transmitted to the user terminal 100.

Figure 5:
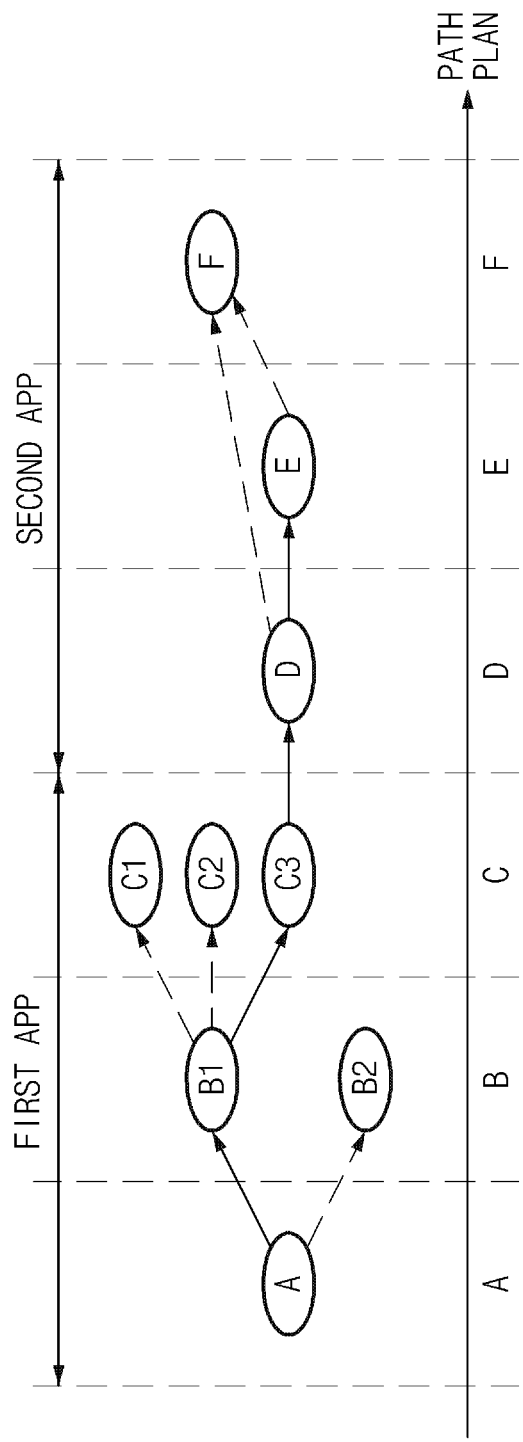
FIG. 5 is a view illustrating a path rule generating method of a natural language understanding (NLU) according to an embodiment of the disclosure.

FIG. 5 is a view illustrating a path rule generating method of a path planner module according to an embodiment of the disclosure.

Referring to FIG. 5, according to an embodiment, the NLU module 220 may divide the function of an app into unit actions (e.g., A to F) and may store the divided unit actions in the PR DB 231. For example, the NLU module 220 may store a path rule set, which includes a plurality of path rules A-B1-C1, A-B1-C2, A-B1-C3-D-F, and A-B1-C3-D-E-F divided into unit actions, in the PR DB 231.

According to an embodiment, the PR DB 231 of the path planner module 230 may store the path rule set for performing the function of an app. The path rule set may include a plurality of path rules each of which includes a plurality of actions. An action executed depending on a parameter input to each of the plurality of actions may be sequentially arranged in the plurality of path rules. According to an embodiment, the plurality of path rules implemented in a form of ontology or a graph model may be stored in the PR DB 231.

According to an embodiment, the NLU module 220 may select an optimal path rule A-B1-C3-D-F of the plurality of path rules A-B1-C1, A-B1-C2, A-B1-C3-D-F, and A-B1-C3-D-E-F corresponding to the intent of a user input and the parameter.

According to an embodiment, in the case where there is no path rule completely matched to the user input, the NLU module 220 may transmit a plurality of rules to the user terminal 100. For example, the NLU module 220 may select a path rule (e.g., A-B1) partly corresponding to the user input. The NLU module 220 may select one or more path rules (e.g., A-B1-C1, A-B1-C2, A-B1-C3-D-F, and A-B1-C3-D-E-F) including the path rule (e.g., A-B1) partly corresponding to the user input and may transmit the one or more path rules to the user terminal 100.

According to an embodiment, the NLU module 220 may select one of a plurality of path rules based on an input added by the user terminal 100 and may transmit the selected one path rule to the user terminal 100. For example, the NLU module 220 may select one path rule (e.g., A-B1-C3-D-F) of the plurality of path rules (e.g A-B1-C1, A-B1-C2, A-B1-C3-D-F, and A-B1-C3-D-E-F) depending on the user input (e.g., an input for selecting C3) additionally entered by the user terminal 100 for the purpose of transmitting the selected one path rule to the user terminal 100.

According to another embodiment, the NLU module 220 may determine the intent of a user and the parameter corresponding to the user input (e.g., an input for selecting C3) additionally entered by the user terminal 100 for the purpose of transmitting the user intent or the parameter to the user terminal 100. The user terminal 100 may select one path rule (e.g., A-B1-C3-D-F) of the plurality of path rules (e.g., A-B1-C1, A-B1-C2, A-B1-C3-D-F, and A-B1-C3-D-E-F) based on the transmitted intent or the transmitted parameter.

As such, the user terminal 100 may complete the actions of the apps 141 and 143 based on the selected path rule.

According to an embodiment, in the case where a user input in which information is insufficient and is received by the intelligence server 200, the NLU module 220 may generate a partial path rule corresponding to the received user input. For example, the NLU module 220 may transmit the partial path rule to the intelligence agent 151. The intelligence agent 151 may transmit the partial path rule to the execution manager module 153, and the execution manager module 153 may execute the first app 141 depending on the partial path rule. The execution manager module 153 may transmit information about an insufficient parameter to the intelligence agent 151 while executing the first app 141. The intelligence agent 151 may request an additional input from a user by using the information about the insufficient parameter. When the additional input is received by the user, the intelligence agent 151 may transmit and process the additional input to the intelligence server 200. The NLU module 220 may generate a path rule to be added, based on the intent of the user input additionally entered and parameter information and may transmit the path rule to be added, to the intelligence agent 151. The intelligence agent 151 may transmit the path rule to the execution manager module 153 and may execute the second app 143.

According to an embodiment, in the case where a user input, in which a portion of information is missed, is received by the intelligence server 200, the NLU module 220 may transmit a user information request to the personal information server 300. The personal information server 300 may transmit information of a user entering the user input stored in a persona database to the NLU module 220. The NLU module 220 may select a path rule corresponding to the user input in which a part of an action is missed, by using the user information. As such, even though the user input in which a portion of information is missed is received by the intelligence server 200, the NLU module 220 may request the missed information to receive an additional input or may determine a path rule corresponding to the user input by using user information.

Figure 6:
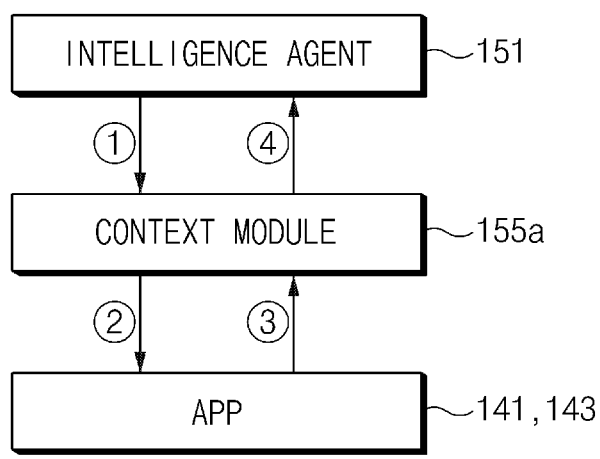
FIG. 6 is a block diagram illustrating that a context module of a processor collects a current state according to an embodiment of the disclosure.

FIG. 6 is a block diagram illustrating that a context module of a processor collects a current state according to an embodiment of the disclosure.

Referring to FIG. 6, when receiving a context request from the intelligence agent 151 ①, the context module 155a may make a request for context information indicating current states of the apps 141 and 143 to the apps 141 and 143 ②. According to an embodiment, the context module 155a may receive the context information from the apps 141 and 143 ③ and may transmit the context information to the intelligence agent 151 ④.

According to an embodiment, the context module 155a may receive pieces of context information through the apps 141 and 143. For example, the context information may be information about the most recently executed apps 141 and 143. For another example, the context information may be information (e.g., information about the corresponding picture in the case where a user watches a picture through a gallery app) about the current states in the apps 141 and 143.

According to an embodiment, the context module 155a may receive context information indicating a current state of the user terminal 100 from a device platform as well as the apps 141 and 143. The context information may include general context information, user context information, or device context information.

The general context information may include general information of the user terminal 100. The general context information may be verified through an internal algorithm by receiving data through a sensor hub of the device platform or the like. For example, the general context information may include information about current time and space. For example, the information about the current time and space may include information about current time or a current location of the user terminal 100. The current time may be verified through the time on the user terminal 100, and the information about the current location may be verified through a global positioning system (GPS). For another example, the general context information may include information about physical motion. For example, the information about the physical motion may include information about walking, running, driving, or the like. The information about the physical motion may be verified through a motion sensor. In the case of the information about driving, the boarding and the parking may be verified by sensing Bluetooth connection in a vehicle as well as the driving is verified through the motion sensor. For another example, the general context information may include user activity information. For example, the user activity information may include information about commuting, shopping, travel, or the like. The user activity information may be verified by using information about a place where a user or an app registers in a database.

The user context information may include information about the user. For example, the user context information may include information about an emotional state of the user. For example, the information about the emotional state of the user may include information about happiness, sadness, anger, or the like of the user. For another example, the user context information may include information about the current state of the user. For example, the information about the current state of the user may include information about interest, intent, or the like (e.g., shopping).

The device context information may include information about the state of the user terminal 100. For example, the device context information may include information about a path rule that the execution manager module 153 performs. For another example, the device information may include information about a battery. For example, the information about the battery may be verified through charging and discharging states of the battery. For another example, the device information may include information about a connected device and a network. For example, the information about the connected device may be verified through a communication interface connected with the device.

Figure 7:
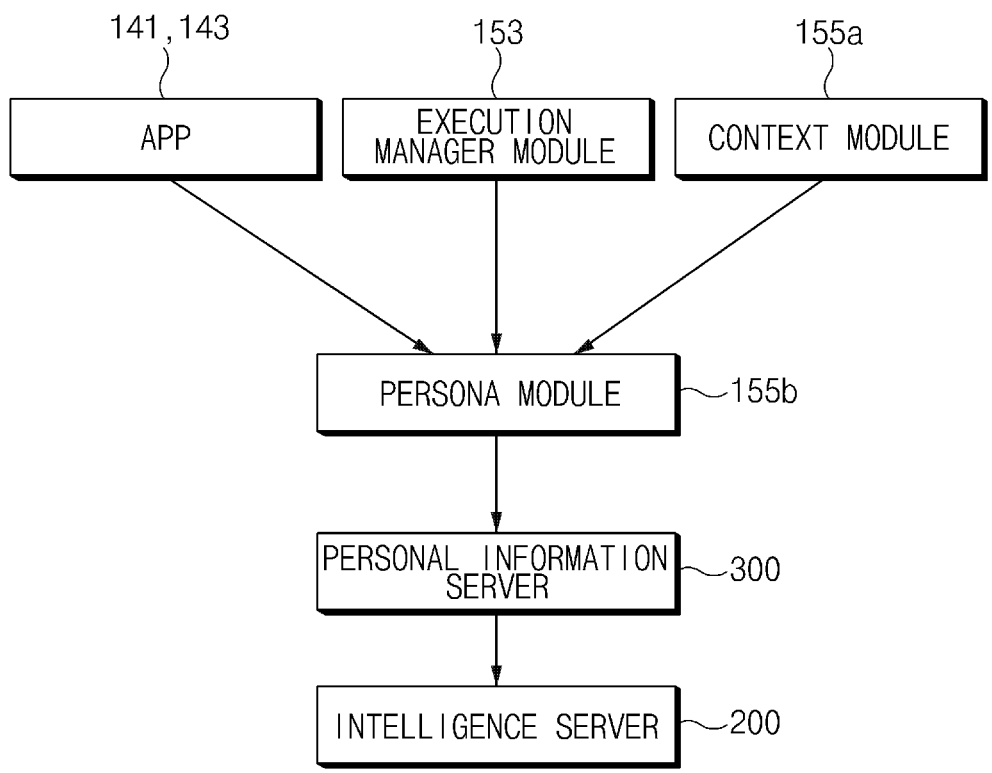
FIG. 7 is a block diagram illustrating that a persona module manages information of a user according to an embodiment of the disclosure.

FIG. 7 is a block diagram illustrating that a persona module manages information of a user according to an embodiment of the disclosure.

Referring to FIG. 7, the persona module 155b may receive information of the user terminal 100 from the apps 141 and 143, the execution manager module 153, or the context module 155a. The apps 141 and 143 and the execution manager module 153 may store information about the result obtained by executing the actions 141b and 143b of an app in an action log database. The context module 155a may store information about a current state of the user terminal 100 in a context database. The persona module 155b may receive the stored information from the action log database or the context database. For example, data stored in the action log database and the context database may be analyzed by an analysis engine and may be transmitted to the persona module 155b.

According to an embodiment, the persona module 155b may transmit information received from the apps 141 and 143, the execution manager module 153, or the context module 155a to the suggestion module 155c. For example, the persona module 155b may transmit the data stored in the action log database or the context database to the suggestion module 155c.

According to an embodiment, the persona module 155b may transmit the information received from the apps 141 and 143, the execution manager module 153, or the context module 155a to the personal information server 300. For example, the persona module 155b may periodically transmit the data, which is accumulated and stored in the action log database or the context database, to the personal information server 300.

According to an embodiment, the persona module 155b may transmit the data stored in the action log database or the context database to the suggestion module 155c. User information generated by the persona module 155*b* may be stored in a persona database. The persona module 155*b* may periodically transmit the user information stored in the persona database to the personal information server 300. According to an embodiment, the information transmitted to the personal information server 300 by the persona module 155*b* may be stored in the persona database. The personal information server 300 may estimate user information necessary to generate a path rule of the intelligence server 200 by using the information stored in the persona database.

According to an embodiment, the user information estimated by using information that the persona module 155*b* transmits may include profile information or preference information. The profile information or the preference information may be estimated through an account of the user and accumulated information.

The profile information may include personal information of the user. For example, the profile information may include population statistics information of the user. For example, the population statistics information may include gender, age, or the like of the user. For another example, the profile information may include life event information. For example, the life event information may be estimated by comparing log information with a life event model and may be strengthened by analyzing a behavior pattern. For another example, the profile information may include interest information. For example, the interest information may include shopping items of interest, interesting fields (e.g., sports, politics, and the like). For another example, the profile information may include activity area information. For example, the activity area information may include information about a house, a work place, or the like. The information about the activity area may include information about an area where a priority is recorded based on accumulated stay time and the number of visits as well as information about a location of a place. For another example, the profile information may include activity time information. For example, the activity time information may include information about a wakeup time, a commute time, a sleep time, or the like. The information about the commute time may be estimated by using the activity area information (e.g., information about a house and a work place). The information about the sleep time may be estimated through an unused time of the user terminal 100.

The preference information may include preference information of the user. For example, the preference information may include information about app preference. For example, the app preference may be estimated through a usage log (e.g., a time- and place-specific usage log) of an app. The app preference may be used to determine an app to be executed depending on a current state (e.g., time or place) of the user. For another example, the preference information may include information about contact preference. For example, the contact preference may be estimated by analyzing information about a contact frequency (e.g., a time- and place-specific frequency of contacting) of a contact. The contact preference may be used to determine a contact to be contacted depending on a current state (e.g., a contact for duplicate names) of the user. For another example, the preference information may include setting information. For example, the setting information may be estimated by analyzing information about setting frequency (e.g., a time- and place-specific frequency of setting a setting value) of a specific setting value. The setting information may be used to set a specific setting value depending on the current state (e.g., a time, a place, or context) of the user. For another example, the preference information may include place preference. For example, the place preference may be estimated through visit history (e.g., a time-specific visit history) of a specific place. The place preference may be used to determine a place to visit depending on the current state (e.g., time) of the user. For another example, the preference information may include instruction preference. For example, the instruction preference may be estimated through a usage frequency (e.g., a time- and place-specific usage frequency) of an instruction. The instruction preference may be used to determine an instruction pattern to be used depending on the current state (e.g., time or place) of the user. In particular, the instruction preference may include information about a menu most frequently selected by the user in the current state of an app being executed by analyzing the log information.

According to an embodiment, the user terminal 100 may receive a user utterance for entering a parameter and may process the user utterance through the intelligence server 200.

According to an embodiment, as shown in Table 1, the user utterance may be distinguished depending on the path rule generated by the intelligence server 200.

TABLE 1

| The type of an utterance | Detailed classification |
| --- | --- |
| Root utterance | Full root utterance |
|  | Partial root utterance |
| Follow-up utterance | Full follow-up utterance |
|  | Partial follow-up utterance |
| Parameter filling utterance | General parameter filling utterance |
|  | Targeted parameter filling utterance |

The root utterance may be an utterance to be processed regardless of the state of the user terminal 100. The user terminal 100 may process the root utterance regardless of the current state. The root utterance may include a full root utterance and a partial root utterance. For example, the full root utterance may be executed (or connected to the last state) up to an operation corresponding to the last state included in the path rule. The partial root utterance may be executed (or partial landing) up to an operation corresponding to the intermediate state (or one state) included in the path rule.

The follow-up utterance may be an utterance processed in a specified state of the user terminal 100. The user terminal 100 may process the follow-up utterance in the specified state. The follow-up utterance may include a full follow-up utterance and a partial follow-up utterance. For example, similarly to the full root utterance, the full follow-up utterance may be executed up to the operation corresponding to the last state included in the path rule corresponding to the user utterance. Similarly to the partial root utterance, the partial follow-up utterance may be executed up to the operation corresponding to the intermediate state included in the path rule corresponding to the user utterance.

The parameter filling utterance may be an utterance processed in a specified state of the user terminal 100. For example, the user terminal 100 may process the parameter filling utterance in a state where parameters capable of being entered. For another example, the user terminal 100 may receive the partial user input (e.g., partial root utterance or partial follow-up utterance) to process the parameter filling utterance in a state of partial landing. In other words, when the user terminal 100 executes an operation corresponding to the intermediate state included in the path rule depending on the user's input, the parameter filling utterance may be an utterance for filling the parameter needed to perform the operation corresponding to the next state.

For example, the user terminal 100 may receive the parameter filling utterance as a user input. For example, the parameter filling utterance may be "Please enter Mom into a recipient field". For example, the user utterance may include a first utterance (e.g., "please enter somebody into a recipient field") and a second utterance (e.g., mom). The first utterance may be an utterance for recognizing that the utterance is a parameter for entering an input field, and the second utterance may be a content input to the input field.

According to an embodiment, the user terminal 100 may display a user interface (UI) including an input field in the display 120 and may receive the parameter filling utterance. For example, the parameter filling utterance may be an utterance in a dictation mode for extracting a specified portion of the user input as a parameter.

According to an embodiment, the user terminal 100 may receive a response including a parameter to be entered into the input field, from the intelligence server 200. The response may further include not only the parameter but also an identifier (or path rule identification (ID)) without the sequence of states of the user terminal 100 for performing the task. In other words, the identifier may have a value, but the specified sequence may be not assigned to the corresponding value. For example, the identifier may correspond to the "dictation" state. When the intelligence server 200 receives the specified utterance (e.g., write down) as a part of the user input, the intelligence server 200 may recognize that the specified utterance is the utterance that is in a dictation mode and may tag the identifier corresponding to the state with the generated parameter.

For example, the user terminal 100 may receive the utterance of the dictation mode as the user input. For example, the user utterance in the dictation state is "write down. The meeting schedule has been changed to Monday". The user utterance may include a first utterance (e.g., write down) and a second utterance (e.g., the meeting schedule has been changed to Monday). The first utterance may be an utterance for recognizing that the user utterance is in a dictation mode, and the second utterance may be content to be entered into the input field. In other words, the first utterance may be a user voice defined to convert the second utterance into a text. The user terminal 100 may tag a corresponding identifier (e.g., dictation_1) to the generated parameter.

Figure 8:
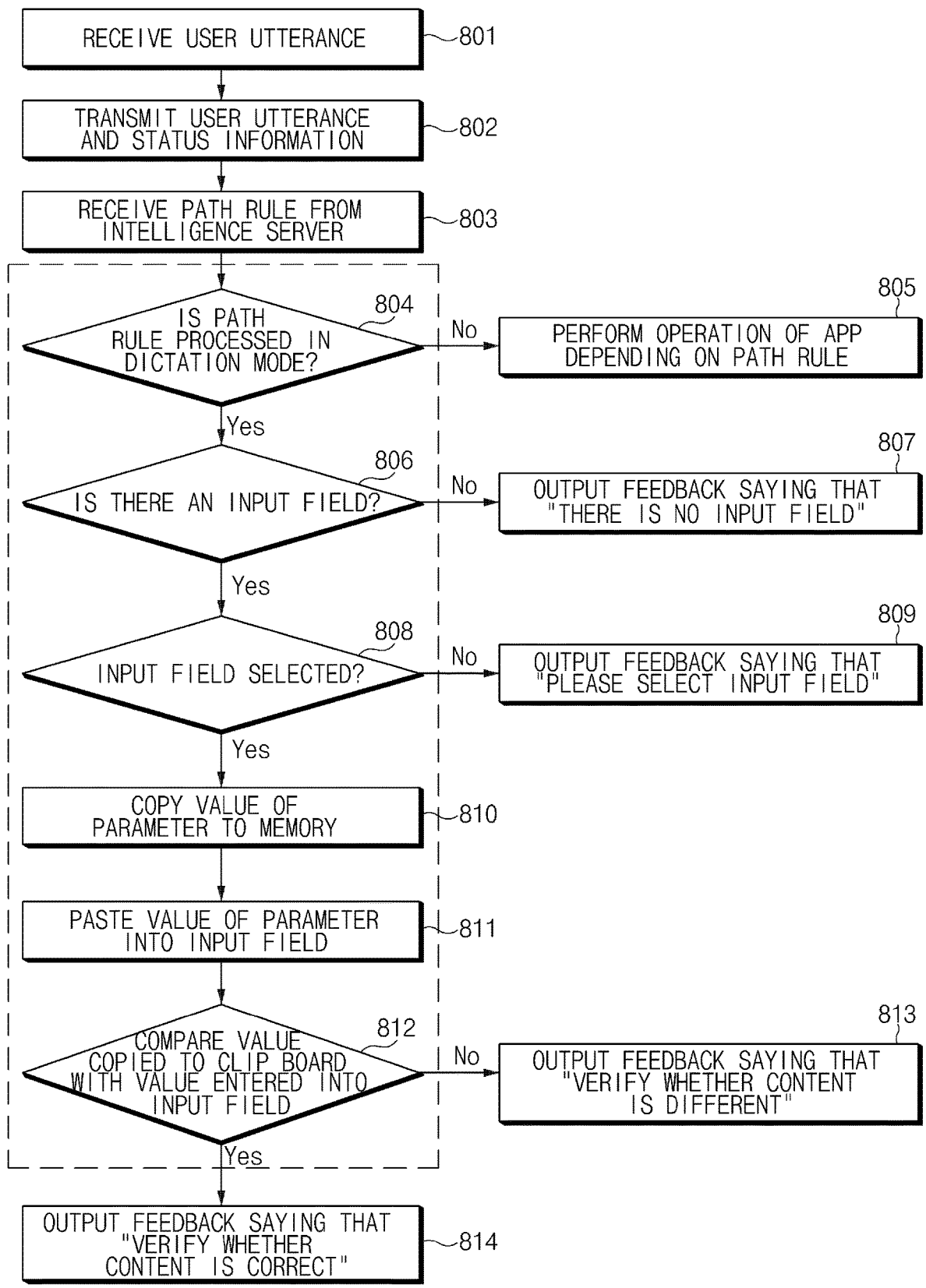
FIG. 8 is a flowchart illustrating a method of processing a parameter to be entered into a user interface (UI) by a user terminal according to an embodiment of the disclosure.

FIG. 8 is a flowchart illustrating a method of processing a parameter to be entered into a UI by a user terminal according to an embodiment of the disclosure.

Referring to FIG. 8, in operation 801, the user terminal 100 (e.g., the intelligence agent 151) may receive a user utterance. The user utterance, for example, a user utterance in a dictation mode may include a first utterance and a second utterance. The first utterance may be an utterance for recognizing the dictation state, and the second utterance may be content to be entered into an input field.

According to an embodiment, in operation 802, the user terminal 100 may transmit data associated with the user utterance to the intelligence server 200 through a communications circuit. In addition, the user terminal 100 may transmit the data and status information (e.g., attribute information of the input field) of the user terminal 100 to the intelligence server 200 through the communication circuit.

According to an embodiment, in operation 803, the user terminal 100 may receive a path rule corresponding to the user utterance and a path rule ID tagged with the path rule. For example, the user terminal 100 may receive the response including the path rule and the path rule ID. The path rule may include a text corresponding to a second utterance of the user utterance. The text corresponding to the second utterance may be obtained through a speech-to-text (STT) included in the ASR module 210.

According to an embodiment, in operation 804, the user terminal 100 (e.g., the execution manager module 153) may determine whether to receive and process the path rule in a dictation mode. The user terminal 100 may recognize the identifier (or the path rule ID) tagged with the path rule to determine whether the identifier corresponds to the path rule corresponding to the user input. For example, the user terminal 100 may receive a path rule without the sequence of states of the user terminal 100 and a path rule ID tagged with the path rule. The user terminal 100 may recognize the path rule ID to determine whether the user input needs to be processed in the dictation mode. According to an embodiment, in the case where the path rule does not need to be processed in the dictation mode (No), in operation 805, the user terminal 100 may perform the operation of an app depending on the path rule.

According to an embodiment, in the case where the path rule needs to be processed in the dictation mode (Yes), in operation 806, the user terminal 100 may determine whether the screen displayed in the display 120 includes an input field for entering a parameter. According to an embodiment, in the case where the user terminal 100 does not include the input field on the screen displayed on the display 120 (No), in operation 807, the user terminal 100 may output feedback saying that "there is no input field" through the speaker 130.

According to an embodiment, in operation 808, the user terminal 100 may determine whether the field into which the parameter is to be entered is selected (or focused). For example, the user terminal 100 may display a UI including a plurality of input fields in the display. The user terminal 100 may determine whether at least one input field among the plurality of input fields is selected. According to an embodiment, in the case where the input field is not selected (No), in operation 809, the user terminal 100 may output the feedback saying that "please select an input field" through the speaker 130. In other words, in the case where the input field is not selected, the user terminal 100 may output a feedback to induce the selection of the input field. Furthermore, when the UI includes a plurality of input fields, the user terminal 100 may output feedback to induce the selection of an input field, into which the text is to be entered, from among the plurality of input fields.

According to an embodiment, in operation 810, the user terminal 100 may copy the value of the parameter to the memory 140. For example, the user terminal 100 may store the value of the parameter on a clip board. For example, the clip board may be a storage space included in the memory 140. For another example, the user terminal 100 may store the value of the parameter in the virtual keyboard memory. For example, the value of the parameter may be a value corresponding to the text to be entered into the input field. In other words, the value of the parameter may include information about a text to be entered into an input field. According to an embodiment, in operation 811, the user terminal 100 may paste the parameter into the input field. For example, the user terminal 100 may paste the user input copied to the clipboard, into the input field. For another example, the user input stored in the virtual keyboard memory may be pasted into the input field. The user terminal 100 may enter a text into the input field based on the attribute of the input field. The user terminal 100 may change the text to a text of another type to enter the text of another type into the input field.

According to an embodiment, in operation 812, the user terminal 100 may compare the value copied to the memory 140 (e.g., a clipboard function associated with an OS) with the value entered into the input field. The user terminal 100 may obtain the value entered into the input field at the framework stage of an app. Moreover, the user terminal 100 may obtain the value entered into the input field by using the getText operation of the screen information recognition module (e.g., accessibility). The screen information recognition module may recognize the object displayed in the display screen. The screen information recognition module may recognize the text information displayed in the display screen. The screen information recognition module may recognize an icon or a text displayed in a text box. Also, in the case where the value entered into the input field is stored in the web, the user terminal 100 may obtain the input value by using a hypertext markup language (HTML). In the case where the changed second text is entered into the input field, the value copied to the memory 140 may be different from the value entered into the input field. According to an embodiment, in the case where the copied value of the clip board is different from the value entered into the input field (No), in operation 813, the user terminal 100 may output the feedback saying that "verify whether the content of the user input is different", through the speaker 130. In other words, when the comparison result indicates that at least part of the first text copied to the memory is not included in the text displayed in the input field, the user terminal 100 may provide a feedback indicating an attribute of the input field. According to an embodiment, in the case where the copied value of the clip board is the same as the value entered into the input field (Yes), in operation 814, the user terminal 100 may output the feedback saying that "verify whether the content is correct", through the speaker 130. In other words, when the comparison result indicates that the first text copied to the memory 140 is included in the text displayed in the input field, the user terminal 100 may provide a feedback to induce verification of the input content.

As such, the user terminal 100 may change a parameter included in a user input to a parameter matched to the attribute of an input field depending on the intent of a user utterance and may enter the parameter matched to the attribute of the input field, thereby preventing an error according to an incorrect input.

Figure 9A:
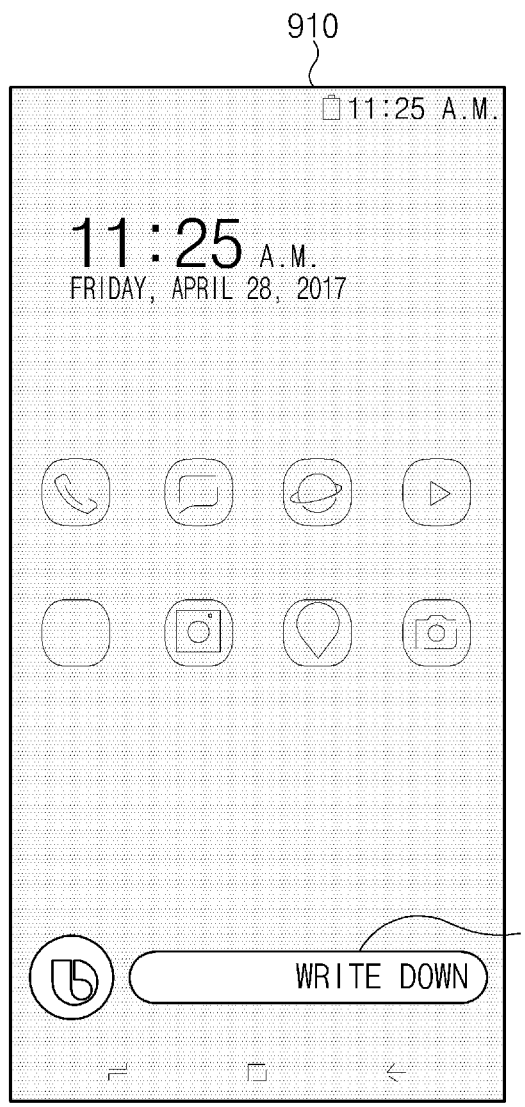
FIGS. 9A and 9B illustrate screens displayed in a dictation mode of a user terminal according to various embodiments of the disclosure.
Figure 9B:
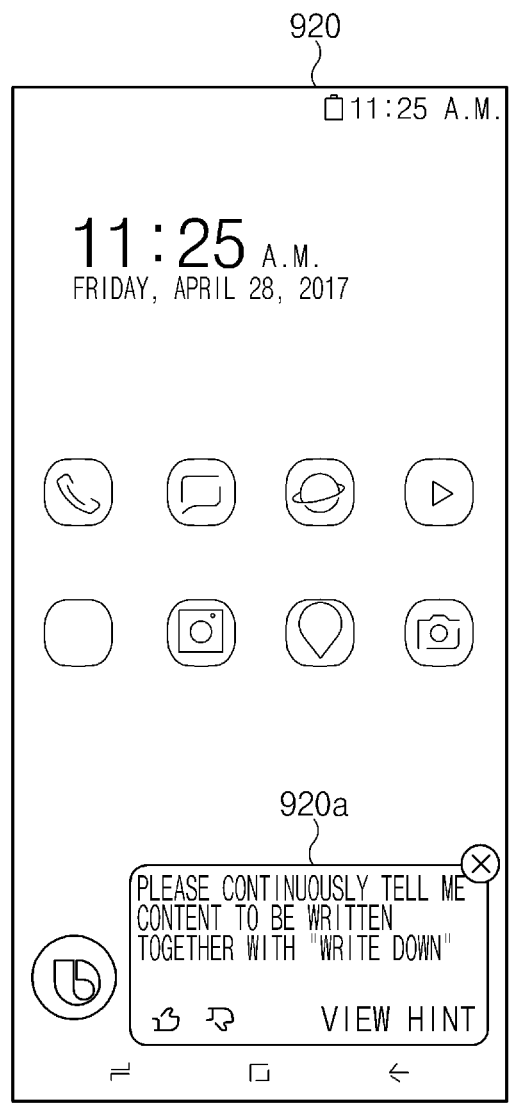

FIGS. 9A and 9B illustrate screens displayed in a dictation mode of a user terminal according to various embodiments of the disclosure.

Referring to FIGS. 9A and 9B, the user terminal 100 may receive a user input in the dictation mode as illustrated in operation 801 of FIG. 8. For example, the user terminal 100 may execute an app for processing a user input and may receive an utterance (e.g., ""write down") for recognizing the dictation mode. Referring to FIG. 9A, the user terminal 100 may display a UI 910*a* of the app for displaying the user utterance on a first display screen 910.

According to an embodiment, the user terminal 100 may receive only the utterance (or the first utterance speech) for recognizing that the user input indicates the dictation mode. In the case where the content being the target of the dictation is not included in the user input, the user terminal 100 may output a feedback (e.g., please continuously tell me the content to be written together with "write down") associated with an input method. Referring to FIG. 9B, the user terminal 100 may display a UI 920*a*, on which a feedback to display a follow-up utterance is displayed, of the app for processing the user utterance in a second display screen 920.

Figure 10A:
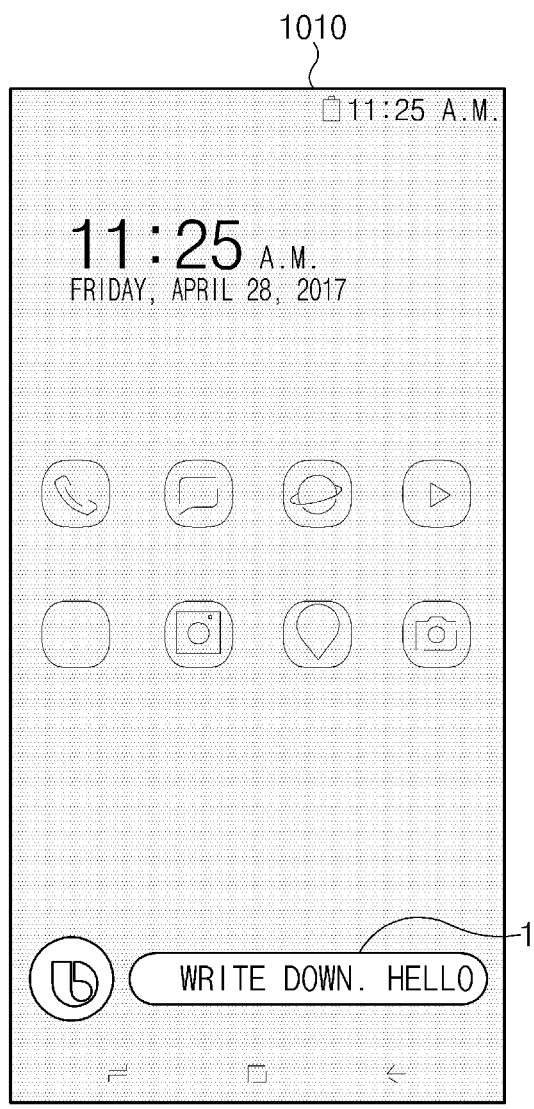
FIGS. 10A and 10B illustrate screens when a user terminal receives a user input while there is no field into which a parameter is entered according to various embodiments of the disclosure.
Figure 10B:
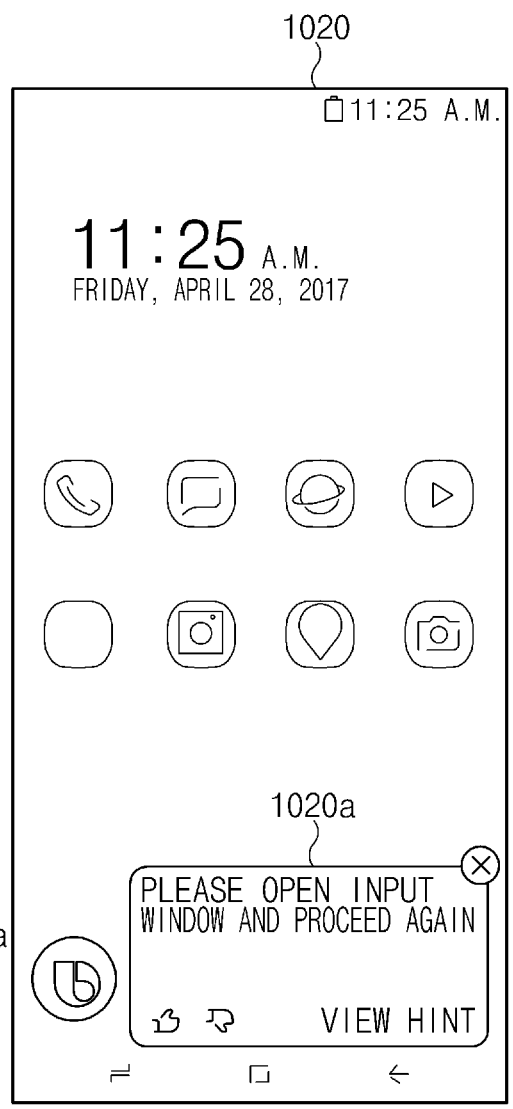

FIGS. 10A and 10B illustrate screens when a user terminal receives a user input while there is no field into which a parameter is entered according to various embodiments of the disclosure.

Referring to FIGS. 10A and 10B, as illustrated in operation 806 and operation 807 of FIG. 8, the user terminal 100 may be in a state where there is no input field for entering a parameter into a display screen 1010. When the input field is absent, the user terminal 100 may receive a user input (e.g., "write down") to change to a dictation mode. Referring to FIG. 10A, the user terminal 100 may display a UI 1010*a* of the app for displaying the user utterance on the first display screen 1010.

According to an embodiment, the user terminal 100 may output a feedback saying that there is no input field for entering the parameter corresponding to a user input. Referring to FIG. 10B, the user terminal 100 may display a UI 1020*a*, in which a feedback to request a user to enter a user input again is displayed in a state where the input field is displayed in the display 120, in the second display screen 1020.

Figure 11A:
FIGS. 11A and 11B illustrate screens when a user terminal receives a user input while a field to be entered is not selected according to various embodiments of the disclosure.
Figure 11B:
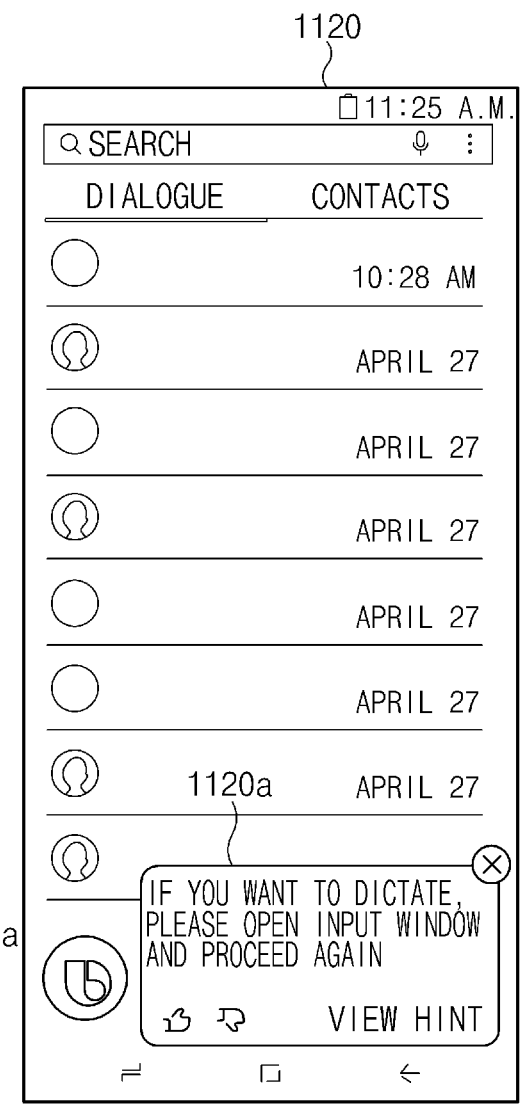

FIGS. 11A and 11B illustrate screens when a user terminal receives a user input while a field to be entered is not selected according to various embodiments of the disclosure.

Referring to FIGS. 11A and 11B, as illustrated in operation 808 and operation 809, the user terminal 100 may be in a state where an input field is not selected. When the input field is absent, the user terminal 100 may receive a user input (e.g., "write down") to change to a dictation mode. Referring to FIG. 11A, the user terminal 100 may display a UI 1110*a* of the app for displaying the user utterance on a first display screen 1110.

According to an embodiment, the user terminal 100 may output a feedback saying that an input field for entering the parameter corresponding to a user input is not selected. Referring to FIG. 11B, the user terminal 100 may display a UI 1120*a*, in which a feedback for receiving an additional input to select an input field is displayed, in a second display screen 1120.

Figure 12A:
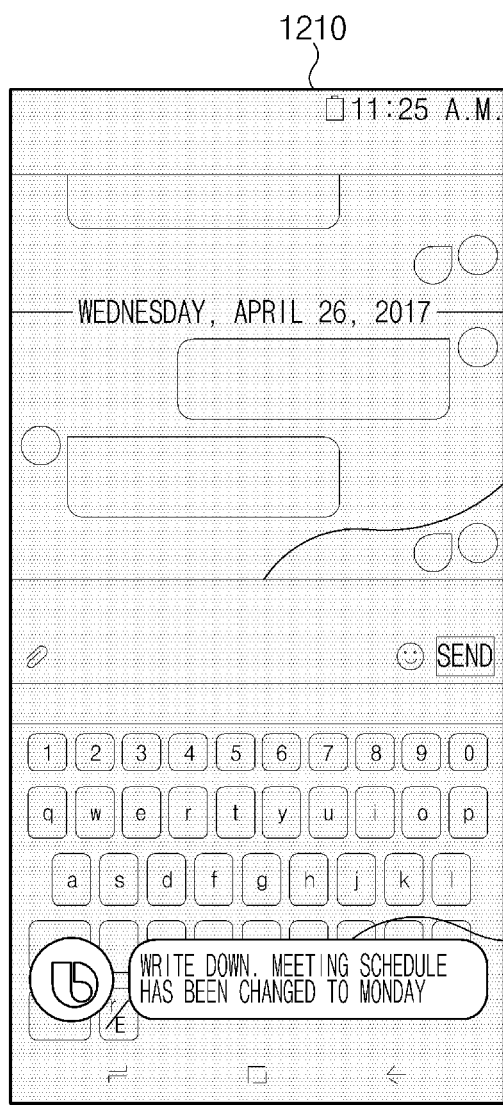
FIGS. 12A and 12B illustrate screens when a user terminal enters a parameter into an input field according to various embodiments of the disclosure.
Figure 12B:
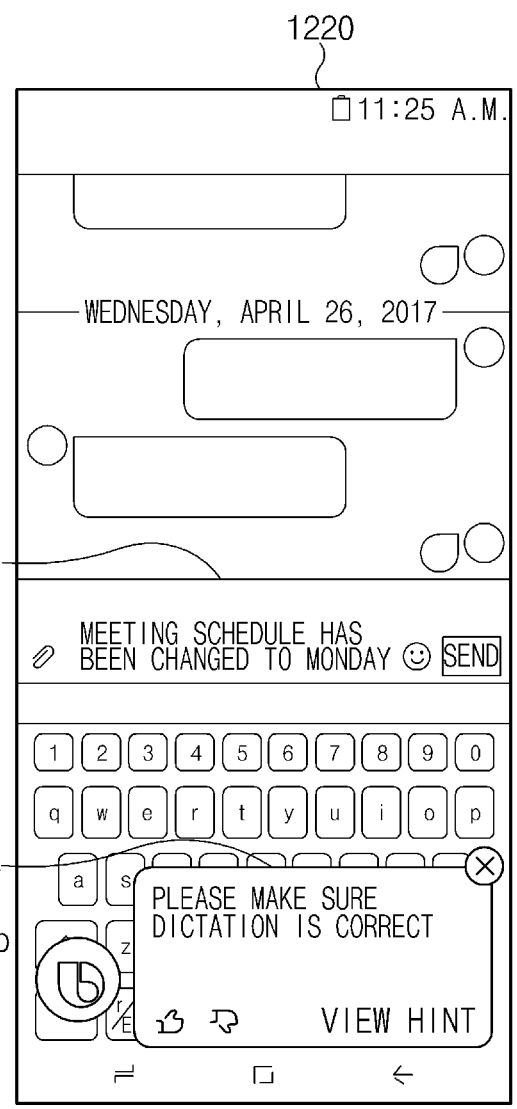

FIGS. 12A and 12B illustrate screens when a user terminal enters a parameter into an input field according to various embodiments of the disclosure.

Referring to FIGS. 12A and 12B, as illustrated in operation 811 and operation 814, the user terminal 100 may be entering a parameter value into an input field 1210*a* and outputting a feedback for verification of the user. The user terminal 100 may receive a user input (e.g., "write down. The meeting schedule has been changed to Monday") to enter a parameter into the input field 1210*a*. The user input may include a first utterance (e.g., "write down") for changing the state of the user terminal 100 to a dictation state and a second utterance (e.g., "the meeting schedule has been changed to Monday"). The first utterance may be an utterance for recognizing the dictation state, and the second utterance may be content to be entered into the input field 1210*a*. Referring to FIG. 12A, the user terminal 100 may display a UI 1210*b* of the app for displaying the user utterance on a first display screen 1210.

According to an embodiment, the user terminal 100 may enter a value corresponding to the parameter into an input field 1220*a*. The user terminal 100 may output a feedback for verification of a user. Referring to FIG. 12B, the user terminal 100 may display a UI 1220b, in which a feedback for verification of the user is displayed, in a display screen 1220.

According to an embodiment, the user terminal 100 may receive a user input including a first utterance and a second utterance. According to an embodiment, the user terminal 100 may receive a path rule including a first text generated based on the second utterance as a parameter, from the intelligence server 200.

According to an embodiment, when the first utterance satisfies a predetermined condition, the user terminal 100 may enter the first text or a second text generated based on the first text, into the input field based on the first text and the attribute of an input field of the UI. The predetermined condition may be the case where the first utterance is a specified utterance (e.g., "write down"). For example, when the attribute of the input field does not support the first text, the user terminal 100 may convert the first text to the second text based on the attribute.

When the input field of an app supporting the calculation function has an equation attribute for receiving the calculation expression, the user terminal 100 may generate a second text including numbers and operators, based on the first text. For another example, when the input field of the app supporting the telephone function has a numeric attribute for receiving the telephone number, the user terminal 100 may generate a second text including the number generated based on the first text.

According to an embodiment, when the attribute of the input field does not support the first text, the user terminal 100 may provide feedback indicating the attribute of the input field.

Figure 13:
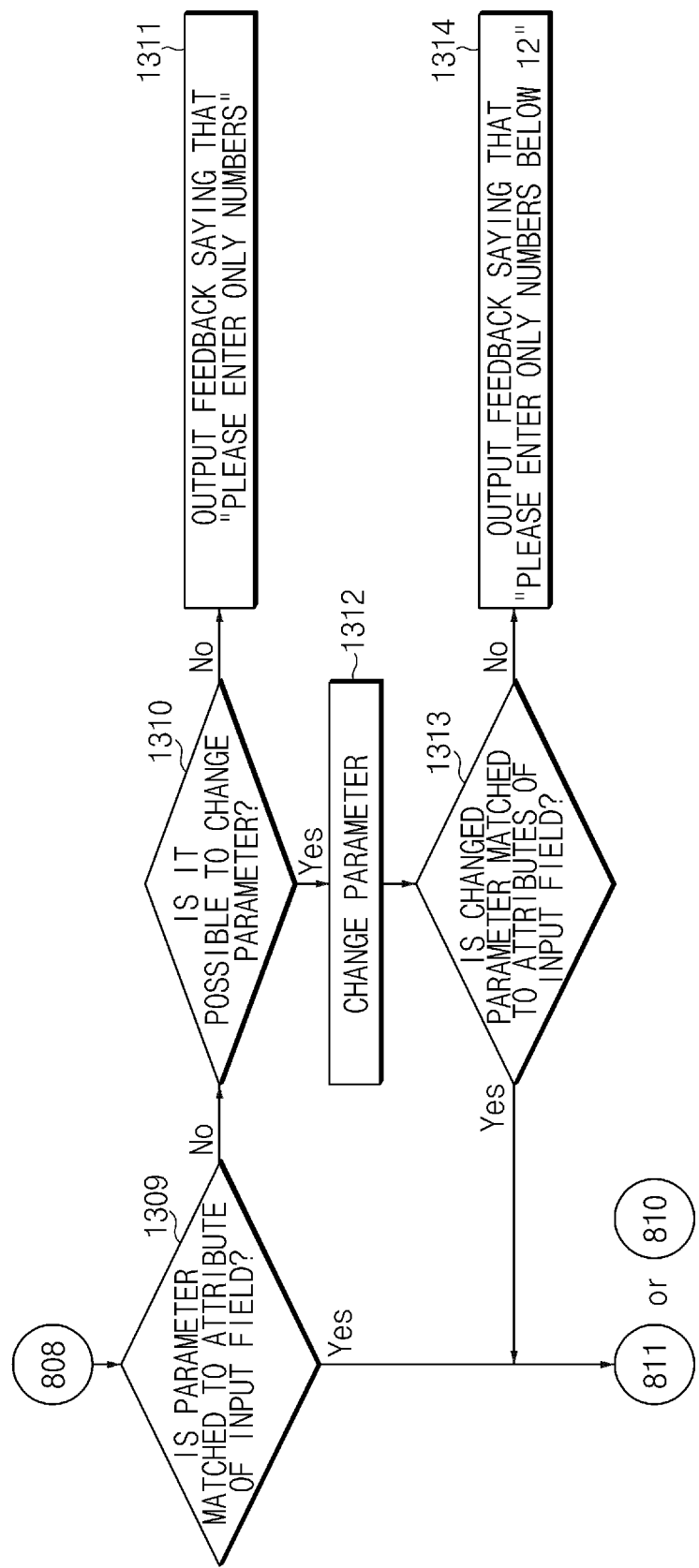
FIG. 13 is a flowchart illustrating a method in which a user terminal processes a parameter entered into an input field according to an embodiment of the disclosure.

FIG. 13 is a flowchart illustrating a method in which a user terminal processes a parameter entered into an input field according to an embodiment of the disclosure.

Referring to FIG. 13, the user terminal 100 may change and enter a parameter depending on the attribute of an input field.

According to an embodiment, in the case where the input field into which the parameter of operation 808 of FIG. 8 is to be input is selected, in operation 1309, the user terminal 100 may determine whether the parameter matches the attribute of the input field. The attribute of the input field may include at least one of a text type (e.g., letter, number, symbol, and operator), a range of numbers (e.g., January to December), and an input language (e.g., English, Chinese, Japanese). For example, the input field may have attribute capable of receiving only the number (e.g., 12-345-6789) in the phone number format. For another example, the input field may have the attribute capable of receiving only the specified number (e.g., 1 to 12) corresponding to, for example, an enumerator or a date (e.g., January to December). According to an embodiment, in the case where the parameter is matched to the attribute of the input field (Yes), the user terminal 100 may copy the parameter value to the memory 140 (e.g., a clipboard) as in operation 810 of FIG. 8. In addition, the user terminal 100 may enter the parameter value into the input field.

According to an embodiment, in operation 1310, the user terminal 100 may determine whether it is possible to change a parameter depending on the attribute of the input field. For example, in the case where the user terminal 100 receives "1 plus 2" as a parameter entered into the expression input field of a calculator app, the user terminal 100 may change the plus to an operator of "+" depending on the attribute of the input field. For another example, in the case where the user terminal 100 receives the "changing a meeting schedule" as a parameter of the field for inputting the month of the schedule application, the user terminal 100 may not change the parameter depending on the attribute of the input field.

According to an embodiment, in the case where it is impossible to change the parameter depending on the attribute of the input field (No), in operation 1311, the user terminal 100 may output a feedback to request a user to enter a user input again such that the parameter is matched to the attribute of the input field. In other words, in the case where it is impossible to change the parameter depending on the attribute of the input field, the user terminal 100 may provide a feedback indicating the attribute of the input field. For example, the user terminal 100 may output the feedback saying that "please enter only numbers" depending on the attribute of the field for inputting the month of the schedule app.

According to an embodiment, in the case where it is possible to change the parameter depending on the attribute of the input field (Yes), in operation 1312, the user terminal 100 may change the parameter to match the attribute of the input field. For example, the user terminal 100 may change the plus of the parameter being "1 plus 2" to an operator of "+". Moreover, in the case where the user terminal 100 receives "thirteen" as a parameter of the field into which the month of the schedule app is entered, twelve (character) may be changed to 12 (number).

According to an embodiment, in operation 1313, the user terminal 100 may determine whether the changed parameter is matched to the attribute of the input field. For example, in operation 1309 and operation 1313, the user terminal 100 may determine whether the parameter is matched to the attribute of the input field depending on to conditions (e.g., a number and a range of numbers), respectively. The user terminal 100 may perform operations 1309 and operation 1313 as one operation. Also, according to an embodiment, in the case where the changed parameter is not matched to the attribute of the input field (No), in 1314 operation, the user terminal 100 may output a feedback to request a user to enter a user input again such that the parameter is matched to the attribute of the input field. According to an embodiment, in the case where the changed parameter is matched to the attribute of the input field (Yes), the user terminal 100 may enter the changed parameter value into the input field, similarly to operation 810 of FIG. 8.

As such, in the case where the parameter of a user input is not matched to the attribute of the input field, the user terminal 100 may recognize that an incorrect parameter is entered. At this time, in the case where the user terminal 100 may change the incorrect parameter to a correct parameter, an error according to an incorrect input may be prevented.

Figure 14:
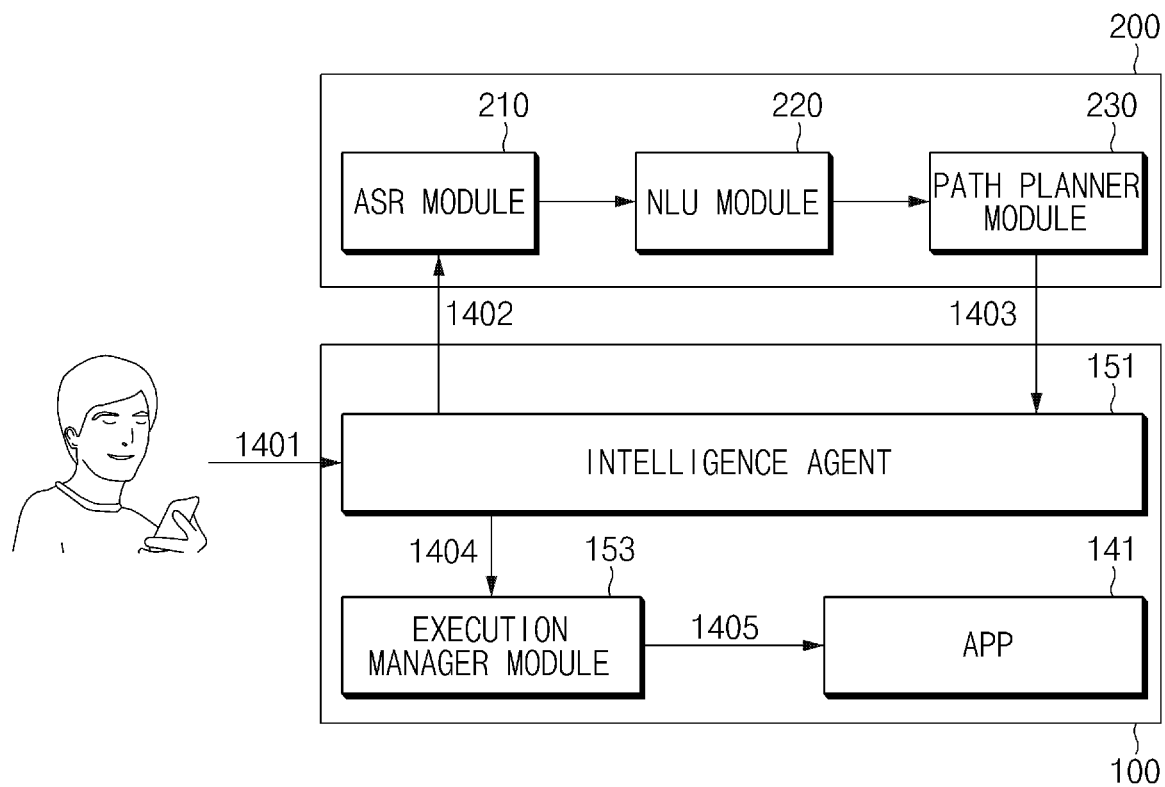
FIG. 14 is a view illustrating how a user terminal processes a user input through an intelligence server according to an embodiment of the disclosure.

FIG. 14 is a view illustrating how a user terminal processes a user input through an intelligence server according to an embodiment of the disclosure.

Referring to FIG. 14, in 1401 operation, the user terminal 100 (e.g., the intelligence agent 151) may receive a user input. The user input may be an utterance (e.g., "write down. The meeting schedule has been changed to Monday") in a dictation mode. The user input may include a first utterance (e.g., "write down") and a second utterance (e.g., "the meeting schedule has been changed to Monday").

According to an embodiment, in operation 1402, the user terminal 100 may transmit a user input to the intelligence server 200. For example, the user terminal 100 may transmit data associated with the user input to the intelligence server 200. According to an embodiment, the user terminal 100 may transmit the status information of the user terminal 100 to the intelligence server 200 together with the user input.

For example, the user terminal 100 may transmit information about the attribute of an input field, into which a parameter (e.g., "the meeting schedule has been changed to Monday") included in the user input is entered, to the intelligence server 200.

According to an embodiment, the intelligence server 200 may generate a path rule corresponding to the received user input. For example, the ASR module 210 may convert "write down. The meeting schedule has been changed to Monday" into text data.

According to an embodiment, the NLU module 220 may obtain a domain (e.g., message app) corresponding to the user input, the intent (e.g., "write down") of the user input, and a parameter (e.g., "the meeting schedule has been changed to Monday") necessary for the operation of the app, by using the text data. The NLU module 220 may recognize that the second utterance (e.g., "the meeting schedule has been changed to Monday") is a parameter, through the first utterance (e.g., "write down"). In other words, the NLU module 220 may recognize the second utterance as a parameter through the first utterance.

According to an embodiment, the NLU module 220 may change the parameter by using the status information of the user terminal 100. For example, the NLU module 220 may determine whether the parameter matches the attribute by using attribute information of an input field into which the parameter is to be entered. According to an embodiment, in the case where the parameter is not matched to the attribute of the input field, the NLU module 220 may output a feedback to request a user to enter a parameter matched to the attribute again. Furthermore, in the case where the NLU module 220 is capable of changing the parameter so as to be matched to the attribute of the input field, the NLU module 220 may change the parameter so as to be matched to the attribute. According to an embodiment, in the case where the parameter is matched to the attribute of the input field, the NLU module 220 may transmit the parameter to the user terminal 100. In the case where the parameter is not matched to the attribute of the input field, the NLU module 220 may output a feedback to request the user to enter a parameter again. An operation in which the NLU module 220 determines or changes the parameter may be similar to the operation of the user terminal 100 (e.g., the execution manager module 153) of FIG. 13.

According to an embodiment, the NLU module 220 may select a path rule depending on the domain and the intent of a user input through the path planner module 230. According to an embodiment, in operation 1403, the intelligence server 200 (e.g., the path planner module 230) may transmit the path rule and a parameter tagged with the path rule to the user terminal 100.

According to an embodiment, in operation 1404, the intelligence agent 151 of the user terminal 100 may transmit the path rule and the parameter to the execution manager module 153. For example, the path rule may be a path rule corresponding to an operation of entering a parameter.

According to an embodiment, in operation 1405, the execution manager module 153 of the user terminal 100 may request the app 141 to perform an operation according to the path rule. For example, the execution manager module 153 may perform the operation of the app 141 that enters "the meeting schedule has been changed to Monday" into a message input field of a message app.

As such, the user terminal 100 may determine whether the parameter of a user input is matched to the attribute of an input field, through the intelligence server 200; at this time, in the case where the user terminal 100 is capable of changing the parameter of the user input to a correct parameter, the user terminal 100 may change the parameter of the user input to the correct parameter, thereby preventing an error according to an incorrect input.

Figure 15:
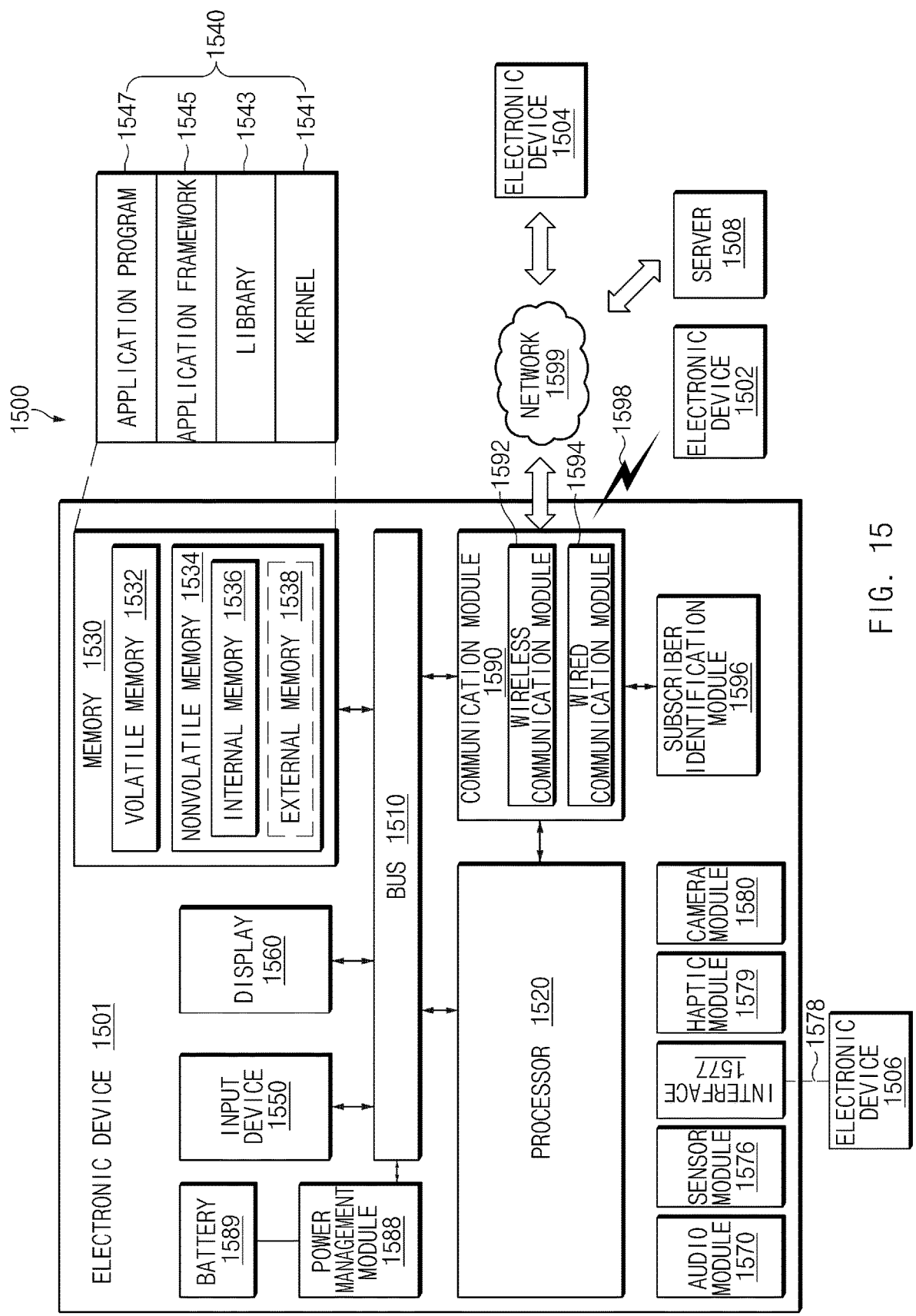
FIG. 15 illustrates an electronic device in a network environment according to various embodiments of the disclosure.

FIG. 15 illustrates a block diagram of an electronic device 1501 in a network environment 1500 according to various embodiments of the disclosure.

Referring to FIG. 15, the electronic device 1501 may include various types of devices. For example, the electronic device 1501 may include at least one of a portable communication device (e.g., smartphones), a computer device (e.g., a PDA, a tablet personal computers (PCs), a laptop PC, a desktop PC, a workstation, or a server), a portable multimedia device (e.g., an e-book reader or an Motion Picture Experts Group phase 1 or phase 2 (MPEG-1 or MPEG-2) audio layer 3 (MP3) player, a portable medical device (e.g., a heart rate, blood glucose, blood pressure, or a thermometer), a camera, or a wearable device. A wearable device may include at least one of an accessory type of a device (e.g., a timepiece, a ring, a bracelet, an anklet, a necklace, glasses, a contact lens, or a head-mounted device (HMD)), one-piece fabric or clothes type of a device (e.g., electronic clothes), a body-attached type of a device (e.g., a skin pad or a tattoo), or a bio-implantable circuit. According to embodiments, the electronic device may include at least one of, for example, televisions (TVs), digital versatile disc (DVD) players, an audio device, audio accessory devices (e.g., a speaker, a headphone, or a headset), a refrigerator, an air conditioner, a cleaner, an oven, a microwave oven, a washing machine, an air cleaner, a set-top box, a home automation control panel, a security control panel, a game console, an electronic dictionary, an electronic key, a camcorder, or an electronic picture frame.

According to another embodiment, the electronic device may include at least one of a navigation device, a global navigation satellite system (GNSS), an event data recorder (EDR) (e.g., a black box for a car, a ship, or a plane), a vehicle infotainment device (e.g., a head-up display for a vehicle), an industrial or home robot, a drone, an automated teller machine (ATM), a point of sales (POS) device, a measurement device (e.g., a water meter, an electricity meter, or a gas meter), or Internet of things (e.g., a light bulb, a sprinkler device, a fire alarm, a thermostat, or a street lamp). According to an embodiment of the disclosure, the electronic device is not limited to the above-described devices. For example, similarly to a smartphone having function of measuring personal bio-information (e.g., a heart rate or blood glucose), the electronic device may provide functions of multiple devices in the complex manner. In the disclosure, the term "user" used herein may refer to a person who uses the electronic device or may refer to a device (e.g., an artificial intelligence electronic apparatus) that uses the electronic device.

Referring to FIG. 15, in the network environment 1500, the electronic device 1501 (e.g., the user terminal 100) may communicate with an electronic device 1502 through local wireless communication 1598 or may communicate with an electronic device 1504 or a server 1508 (e.g., the intelligence server 200) through a second network 1599. According to an embodiment, the electronic device 1501 may communicate with the electronic device 1504 through the server 1508.

According to an embodiment, the electronic device 1501 may include a bus 1510, a processor 1520 (e.g., the processor 150), a memory 1530, an input device 1550 (e.g., a microphone or a mouse), a display 1560, an audio module 1570, a sensor module 1576, an interface 1577, a haptic module 1579, a camera module 1580, a power management module 1588, a battery 1589, a communication module 1590, and a subscriber ID module 1596. According to an embodiment, the electronic device 1501 may not include at least one (e.g., the display 1560 or the camera module 1580) of the above-described elements or may further include other element(s).

For example, the bus 1510 may interconnect the above-described elements 1520 to 1590 and may include a circuit for conveying signals (e.g., a control message or data) between the above-described elements.

The processor 1520 (e.g., the processor 150) may include one or more of a central processing unit (CPU), an application processor (AP), a graphical processing unit (GPU), an image signal processor (ISP) of a camera, or a communication processor (CP). According to an embodiment, the processor 1520 may be implemented with a system on chip (SoC) or a system in package (SiP). For example, the processor 1520 may drive an OS or an application to control at least one of another element (e.g., hardware or software element) connected to the processor 1520 and may process and compute various data. The processor 1520 may load an instruction or data, which is received from at least one of other elements (e.g., the communication module 1590), into a volatile memory 1532 to process the instruction or data and may store the process result data into a nonvolatile memory 1534.

The memory 1530 may include, for example, the volatile memory 1532 or the nonvolatile memory 1534. The volatile memory 1532 may include, for example, a random access memory (RAM) (e.g., a dynamic RAM (DRAM), a static RAM (SRAM), or a synchronous DRAM (SDRAM)). The nonvolatile memory 1534 may include, for example, a read-only memory (ROM), a programmable ROM (PROM), an one time PROM (OTPROM), an erasable PROM (EPROM), an electrically EPROM (EEPROM), a mask ROM, a flash ROM, a flash memory, a hard disk drive, or a solid-state drive (SSD). In addition, the nonvolatile memory 1534 may be configured in the form of an internal memory 1536 or the form of an external memory 1538 which is available through connection only if necessary, according to the connection with the electronic device 1501. The external memory 1538 may further include a flash drive such as compact flash (CF), secure digital (SD), micro-SD, mini-SD, extreme digital (xD), a multimedia card (MMC), or a memory stick. The external memory 1538 may be operatively or physically connected with the electronic device 1501 in a wired manner (e.g., a cable or a universal serial bus (USB)) or a wireless (e.g., Bluetooth) manner.

For example, the memory 1530 may store, for example, at least one different software element, such as an instruction or data associated with the program 1540, of the electronic device 1501. The program 1540 may include, for example, a kernel 1541, a library 1543, an application framework 1545 or an application program (interchangeably, "application") 1547.

The input device 1550 may include a microphone, a mouse, or a keyboard. According to an embodiment, the keyboard may include a keyboard physically connected or a keyboard virtually displayed through the display 1560.

The display 1560 may include a display, a hologram device or a projector, and a control circuit to control a relevant device. The screen may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 1501.

The audio module 1570 may convert, for example, from a sound into an electrical signal or from an electrical signal into the sound. According to an embodiment, the audio module 1570 may acquire sound through the input device 1550 (e.g., a microphone) or may output sound through an output device (not illustrated) (e.g., a speaker or a receiver) included in the electronic device 1501, an external electronic device (e.g., the electronic device 1502 (e.g., a wireless speaker or a wireless headphone)) or an electronic device 1506 (e.g., a wired speaker or a wired headphone) connected with the electronic device 1501.

The sensor module 1576 may measure or detect, for example, an internal operating state (e.g., power or temperature) or an external environment state (e.g., an altitude, a humidity, or brightness) of the electronic device 1501 to generate an electrical signal or a data value corresponding to the information of the measured state or the detected state. The sensor module 1576 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (HRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an ultraviolet (UV) sensor. The sensor module 1576 may further include a control circuit for controlling at least one or more sensors included therein. According to an embodiment, the electronic device 1501 may control the sensor module 1576 by using the processor 1520 or a processor (e.g., a sensor hub) separate from the processor 1520. In the case that the separate processor (e.g., a sensor hub) is used, while the processor 1520 is in a sleep state, the electronic device 1501 may operate without awakening the processor 1520 to control at least a portion of the operation or the state of the sensor module 1576.

According to an embodiment, the interface 1577 may include a high definition multimedia interface (HDMI), a USB, an optical interface, a recommended standard 232 (RS-232), a D-subminiature (D-sub), a mobile high-definition link (MHL) interface, a SD card/MMC interface, or an audio interface. A connector 1578 may physically connect the electronic device 1501 and the electronic device 1506. According to an embodiment, the connector 1578 may include, for example, an USB connector, an SD card/MMC connector, or an audio connector (e.g., a headphone connector).

The haptic module 1579 may convert an electrical signal into mechanical stimulation (e.g., vibration or motion) or into electrical stimulation. For example, the haptic module 1579 may apply tactile or kinesthetic stimulation to a user. The haptic module 1579 may include, for example, a motor, a piezoelectric element, or an electric stimulator.

The camera module 1580 may capture, for example, a still image and a moving picture. According to an embodiment, the camera module 1580 may include at least one lens (e.g., a wide-angle lens and a telephoto lens, or a front lens and a rear lens), an image sensor, an ISP, or a flash (e.g., a LED or a xenon lamp).

The power management module 1588, which is to manage the power of the electronic device 1501, may constitute at least a portion of a power management integrated circuit (PMIC).

The battery 1589 may include a primary cell, a secondary cell, or a fuel cell and may be recharged by an external power source to supply power at least one element of the electronic device 1501.

The communication module 1590 may establish a communication channel between the electronic device 1501 and an external device (e.g., the first external electronic device 1502, the second external electronic device 1504, or the server 1508). The communication module 1590 may support wired communication or wireless communication through the established communication channel. According to an embodiment, the communication module 1590 may include a wireless communication module 1592 or a wired communication module 1594. The communication module 1590 may communicate with the external device through a local wireless communication 1598 (e.g. a wireless local area network (LAN) such as Bluetooth or infrared data association (IrDA)) or a second network 1599 (e.g., a wireless wide area network (WAN) such as a cellular network).

The wireless communication module 1592 may support, for example, cellular communication, local wireless communication, GNSS communication. The cellular communication may include, for example, long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). The local wireless communication may include wireless fidelity (Wi-Fi), Wi-Fi direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a GPS, a global navigation satellite system (Glonass), Beidou navigation satellite system (Beidou), a European global satellite-based navigation system (Galileo), or the like. In the disclosure, "GPS" and "GNSS" may be interchangeably used.

According to an embodiment, when the wireless communication module 1592 supports cellar communication, the wireless communication module 1592 may, for example, identify or authenticate the electronic device 1501 within a communication network using the subscriber ID module 1596. According to an embodiment, the wireless communication module 1592 may include a CP separate from the processor 1520 (e.g., an AP). In this case, the CP may perform at least a portion of functions associated with at least one of elements 1510 to 1596 of the electronic device 1501 in substitute for the processor 1520 when the processor 1520 is in an inactive (sleep) state, and together with the processor 1520 when the processor 1520 is in an active state. According to an embodiment, the wireless communication module 1592 may include a plurality of communication modules, each supporting only a relevant communication scheme among cellular communication, short-range wireless communication, or a GNSS communication scheme.

The wired communication module 1594 may include, for example, include a LAN service, a power line communication, or a plain old telephone service (POTS).

For example, the local wireless communication 1598 may employ, for example, Wi-Fi direct or Bluetooth for transmitting or receiving instructions or data through wireless direct connection between the electronic device 1501 and the first external electronic device 1502. The second network 1599 may include a telecommunication network (e.g., a computer network such as a LAN or a WAN, the Internet or a telephone network) for transmitting or receiving instructions or data between the electronic device 1501 and the second electronic device 1504.

According to various embodiments, the instructions or the data may be transmitted or received between the electronic device 1501 and the second external electronic apparatus 1504 through the server 1508 connected with the second network. Each of the external first and second external electronic devices 1502 and 1504 may be a device of which the type is different from or the same as that of the electronic device 1501. According to various embodiments, all or a part of operations that the electronic device 1501 will perform may be executed by another or a plurality of electronic apparatuses (e.g., the electronic devices 1502 and 1504 or the server 1508). According to an embodiment, in the case that the electronic device 1501 executes any function or service automatically or in response to a request, the electronic device 1501 may not perform the function or the service internally, but may alternatively or additionally transmit requests for at least a part of a function associated with the electronic device 1501 to another device (e.g., the electronic apparatus 1502 or 1504 or the server 1508). The other electronic apparatus (e.g., the electronic apparatus 1502 or 1504 or the server 1508) may execute the requested function or additional function and may transmit the execution result to the electronic device 1501. The electronic device 1501 may provide the requested function or service using the received result or may additionally process the received result to provide the requested function or service. To this end, for example, cloud computing, distributed computing, or client-server computing may be used.

Various embodiments of the disclosure and terms used herein are not intended to limit the technologies described in the disclosure to specific embodiments, and it should be understood that the embodiments and the terms include modification, equivalent, and/or alternative on the corresponding embodiments described herein. With regard to description of drawings, similar elements may be marked by similar reference numerals. The terms of a singular form may include plural forms unless otherwise specified. In the disclosure disclosed herein, the expressions "A or B", "at least one of A and/or B", "at least one of A and/or B", "A, B, or C", or "at least one of A, B, and/or C", and the like used herein may include any and all combinations of one or more of the associated listed items. Expressions such as "first", or "second" and the like, may express their elements regardless of their priority or importance and may be used to distinguish one element from another element but is not limited to these components. When an (e.g., first) element is referred to as being "(operatively or communicatively) coupled with/to" or "connected to" another (e.g., second) element, it may be directly coupled with/to or connected to the other element or an intervening element (e.g., a third element) may be present.

According to the situation, the expression "adapted to or configured to" used herein may be interchangeably used as, for example, the expression "suitable for", "having the capacity to", "changed to", "made to", "capable of" or "designed to". The expression "a device configured to" may mean that the device is "capable of" operating together with another device or other components. For example, a "processor configured to (or set to) perform A, B, and C" may mean a dedicated processor (e.g., an embedded processor) for performing corresponding operations or a generic-purpose processor (e.g., a CPU or an AP) which performs corresponding operations by executing one or more software programs which are stored in a memory device (e.g., the memory 1530).

The term "module" used in this specification may include a unit implemented with hardware, software, or firmware. For example, the term "module" may be interchangeably used with the term "logic", "logic block", "component", "circuit", and the like. The "module" may be an integrated component, a minimum unit for performing one or more functions, or a part thereof. The "module" may be implemented mechanically or electronically. For example, the module may include a well-known or to-be-developed application-specific integrated circuit (ASIC) chip, field-programmable gate arrays (FPGAs), or programmable logic device that perform any operations.

According to various embodiments, at least a part of an apparatus (e.g., modules or functions thereof) or a method (e.g., operations) may be, for example, implemented by instructions stored in a computer-readable storage media (e.g., the memory 1530) in the form of a program module. The instruction, when executed by a processor (e.g., a processor 1520), may cause the processor to perform a function corresponding to the instruction. The computer-readable recording medium may include a hard disk, a floppy disk, a magnetic media (e.g., a magnetic tape), an optical media (e.g., a compact disc-ROM (CD-ROM) and a DVD, a magneto-optical media (e.g., a floptical disk)), an embedded memory, and the like. The instruction may include codes created by a compiler or codes that are capable of being executed by a computer by using an interpreter.

Each element (e.g., a module or a program module) according to various embodiments may be composed of single entity or a plurality of entities, and a part of the above-described sub-elements may be omitted or may further include other elements. Alternatively or additionally, after being integrated in one entity, some elements (e.g., a module or a program module) may identically or similarly perform the function executed by each corresponding element before integration. Operations executed by modules, program modules, or other elements may be executed by a successive method, a parallel method, a repeated method, or a heuristic method. Alternatively, at least some of the operations may be executed in another order or may be omitted, or any other operation may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
   a housing;
   a touchscreen display positioned inside the housing and exposed through a first area of the housing;
   a microphone positioned inside the housing and exposed through a second area of the housing;
   at least one speaker positioned inside the housing and exposed through a third area of the housing;
   a wireless communication circuit positioned inside the housing;
   a processor positioned inside the housing and electrically connected to the touchscreen display, the microphone, the at least one speaker, and the wireless communication circuit; and
   a memory positioned in the housing and electrically connected with the processor, wherein the memory stores instructions, when executed, cause the processor to:
   display a user interface (UI) of an application in the touchscreen display,
   receive a user input including a first utterance and a second utterance through the microphone,
   transmit data associated with the user input to an external server through the wireless communication circuit,
   receive a response including a first text corresponding to the second utterance from the external server through the wireless communication circuit,
   when the first utterance satisfies a predetermined condition:
      enter the first text into an input field of the UI in response to determining that an attribute of the input field supports the first text, and
      convert the first text to a second text based on the attribute of the input field in response to determining that the attribute of the input field of the UI does not support the first text, and enter the second text into the input field, and when the attribute of the input field supports the first text,
      enter the first text into the input field,
      compare a third text displayed in the input field with the first text, depending on a result of entering the first text into the input field, and
      provide a feedback to the UI based on the result of the comparison.

2. The electronic apparatus of claim 1, wherein the first utterance corresponds to a user voice defined to convert the second utterance into the first text.

3. The electronic apparatus of claim 2, wherein the first text is obtained through speech-to-text (STT) speech recognition associated with the second utterance.

4. The electronic apparatus of claim 1, wherein the instructions, when executed, further cause the processor to, when the attribute of the input field does not support the first text, provide a feedback indicating the attribute of the input field.

5. The electronic apparatus of claim 1, wherein the second text generated based on the first text includes a number and an operator, when the application supports a calculation function and the input field includes an equation attribute for receiving a mathematical expression.

6. The electronic apparatus of claim 1, wherein the second text generated based on the first text includes a number, when the application supports a telephone function and the input field includes a numeric attribute for receiving a telephone number.

7. The electronic apparatus of claim 1, wherein the instructions, when executed, further cause the processor to, when the input field of the UI is not selected, output a feedback to induce selection of the input field.

8. The electronic apparatus of claim 1, wherein the instructions, when executed, further cause the processor to, when the UI includes a plurality of input fields, output a feedback to induce selection of another input field, into which the first text is to be entered, from among the plurality of input fields.

9. An electronic apparatus comprising:
a housing;
a touchscreen display positioned inside the housing and exposed through a first area of the housing;
a microphone positioned inside the housing and exposed through a second area of the housing;
at least one speaker positioned inside the housing and exposed through a third area of the housing;
a wireless communication circuit positioned inside the housing;
a processor positioned inside the housing and electrically connected to the touchscreen display, the microphone, the at least one speaker, and the wireless communication circuit; and
a memory positioned in the housing and electrically connected with the processor, wherein the memory stores instructions, when executed, cause the processor to:
display a user interface (UI) of an application including an input field in the touchscreen display,
receive a user input including a first utterance and a second utterance through the microphone,
transmit data associated with the user input and information about an attribute of the input field to an external server through the wireless communication circuit,
receive a response including a first text generated based on the second utterance and the attribute of the input field from the external server through the wireless communication circuit,
when the first utterance satisfies a predetermined condition:
enter the first text into the input field in response to determining that the attribute of the input field of the UI supports the first text,
convert the first text to a second text based on the attribute of the input field in response to determining that the attribute of the input field of the UI does not support the first text, and enter the second text into the input field,
copy the first text to the memory,
provide feedback based on a result of comparing a third text displayed in the input field with the first text by entering the first text, and
when a result of the comparison indicates that the first text is included in the third text, provide the feedback to induce verification of input content.

10. The electronic apparatus of claim 9, wherein the instructions, when executed, further cause the processor to, when a result of the comparison indicates at least part of the first text is not included in the third text, provide the feedback indicating the attribute of the input field.

11. An electronic apparatus comprising:
a memory; and
a processor,
wherein the memory stores instructions, when executed, cause the processor to:
display a user interface (UI) of an application including an input field in a touchscreen display,
receive a user input from a user including a first utterance and a second utterance, through a microphone,
transmit data associated with the user input and information related to an attribute of the input field to an external server,
receive a response including an identification (ID) corresponding for the first utterance and a first text corresponding for the second utterance from the external server,
determine the ID corresponds to a dictation state for entering the first text in an input field,
in response to the determining that the ID corresponds to the dictation state:
enter the first text into the input field of the UI in response to determining that an attribute of the input field supports the first text, and
convert the first text to a second text based on the attribute of the input field in response to determining that the attribute of the input field of the UI does not support the first text and enter the second text into the input field, when the attribute of the input field supports the first text,
enter the first text into the input field,
compare a third text displayed in the input field with the first text, depending on a result of entering the first text into the input field, and
provide a feedback to the UI based on the result of the comparison.

12. The electronic apparatus of claim 11,
wherein the first utterance corresponds to a user voice defined to convert the second utterance into the first text.

* * * * *